United States Patent
Liu et al.

(10) Patent No.: US 11,611,747 B2
(45) Date of Patent: Mar. 21, 2023

(54) ADAPTIVE LOOP FILTERING FOR VIDEO CODING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Hsiao Chiang Chuang, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/399,839

(22) Filed: Aug. 11, 2021

(65) Prior Publication Data

US 2021/0385446 A1 Dec. 9, 2021

Related U.S. Application Data

(63) Continuation of application No. PCT/CN2020/085075, filed on Apr. 16, 2020.

(30) Foreign Application Priority Data

Apr. 16, 2019 (WO) ................ PCT/CN2019/082855

(51) Int. Cl.
*H04N 19/117* (2014.01)
*H04N 19/70* (2014.01)
(Continued)

(52) U.S. Cl.
CPC ......... *H04N 19/117* (2014.11); *H04N 19/132* (2014.11); *H04N 19/176* (2014.11); *H04N 19/70* (2014.11)

(58) Field of Classification Search
CPC .. H04N 19/117; H04N 19/132; H04N 19/176; H04N 19/70; H04N 19/82; H04N 19/14
See application file for complete search history.

(56) References Cited

U.S. PATENT DOCUMENTS

| 8,929,462 B2 | 1/2015 | Wang et al. |
| 9,591,331 B2 | 3/2017 | Chong et al. |
(Continued)

FOREIGN PATENT DOCUMENTS

| CN | 102857746 A | 1/2013 |
| CN | 103096054 A | 5/2013 |
(Continued)

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
(Continued)

*Primary Examiner* — Joseph W Becker
(74) *Attorney, Agent, or Firm* — Perkins Coie LLP

(57) ABSTRACT

Devices, systems and methods for adaptive loop filtering are described. In an exemplary aspect, a method for video processing includes performing, for a current video block of a video, a filtering process that uses filter coefficients and comprises two or more operations with at least one intermediate result, applying a clipping operation to the at least one intermediate result, and performing, based on the at least one intermediate result, a conversion between the current video block and a bitstream representation of the video, wherein the at least one intermediate result is based on a weighted sum of the filter coefficients and differences between a current sample of the current video block and neighboring samples of the current sample.

17 Claims, 19 Drawing Sheets

(51) Int. Cl.
*H04N 19/132* (2014.01)
*H04N 19/176* (2014.01)

(56) References Cited

U.S. PATENT DOCUMENTS

| | | | |
|---|---|---|---|
| 9,813,719 | B2 | 11/2017 | Wang |
| 10,057,574 | B2 | 8/2018 | Li et al. |
| 10,271,052 | B2 | 4/2019 | Zhang et al. |
| 10,277,909 | B2 | 4/2019 | Ye et al. |
| 10,404,988 | B2 | 9/2019 | Ye et al. |
| 10,506,230 | B2 | 12/2019 | Zhang et al. |
| 10,582,213 | B2 | 3/2020 | Li et al. |
| 10,694,202 | B2 | 6/2020 | Zhang et al. |
| 10,694,204 | B2 | 6/2020 | Chen et al. |
| 10,721,469 | B2 | 7/2020 | Zhang et al. |
| 10,764,576 | B2 | 9/2020 | Li et al. |
| 10,778,974 | B2 | 9/2020 | Karczewicz et al. |
| 10,855,985 | B2 | 12/2020 | Zhang et al. |
| 2007/0058713 | A1 | 3/2007 | Shen et al. |
| 2009/0116558 | A1 | 5/2009 | Chen et al. |
| 2013/0107973 | A1 | 5/2013 | Wang et al. |
| 2013/0259118 | A1* | 10/2013 | Fu .............. H04N 19/177 375/240.02 |
| 2015/0016551 | A1* | 1/2015 | Esenlik .......... H04N 19/463 375/240.29 |
| 2015/0043641 | A1* | 2/2015 | Gamei ........... H04N 19/117 375/240.12 |
| 2015/0049821 | A1 | 2/2015 | Chen et al. |
| 2017/0238020 | A1 | 8/2017 | Karczewicz et al. |
| 2018/0041778 | A1 | 2/2018 | Zhang et al. |
| 2018/0041779 | A1 | 2/2018 | Zhang et al. |
| 2018/0192050 | A1 | 7/2018 | Zhang et al. |
| 2018/0288441 | A1 | 10/2018 | Zhang et al. |
| 2018/0302621 | A1 | 10/2018 | Fu et al. |
| 2018/0359486 | A1 | 12/2018 | Lai et al. |
| 2019/0238845 | A1 | 8/2019 | Zhang et al. |
| 2019/0306502 | A1 | 10/2019 | Gadde et al. |
| 2020/0177910 | A1 | 6/2020 | Li et al. |
| 2020/0267381 | A1 | 8/2020 | Vanam et al. |
| 2020/0322632 | A1 | 10/2020 | Hanhart et al. |
| 2020/0359016 | A1 | 11/2020 | Li et al. |
| 2020/0359017 | A1 | 11/2020 | Li et al. |
| 2020/0359018 | A1 | 11/2020 | Li et al. |
| 2020/0413038 | A1 | 12/2020 | Zhang et al. |

FOREIGN PATENT DOCUMENTS

| | | |
|---|---|---|
| CN | 104735450 A | 6/2015 |
| CN | 109076219 A | 12/2018 |
| EP | 3297282 A1 | 3/2018 |
| JP | 2013524678 A | 6/2013 |
| JP | 2015080002 A | 4/2015 |
| JP | 2017513335 A | 5/2017 |
| JP | 2018509074 A | 3/2018 |
| JP | 2020017970 A | 1/2020 |
| WO | 2013145174 A1 | 10/2013 |

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Hu et al. "CE5: Coding Tree Block Based Adaptive Loop Filter (CE5-4)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0415, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Karczewicz et al. "Geometry Tranformation-based Adaptive In-Loop Filter," 2016, IEEE Qualcomm Technologies Inc. San Diego, CA, USA.

Karczewicz et al. "CE2-Related: CTU Based Adaptive Loop Filtering," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0382, 2018.

Lim et al. "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0147, 2018.

Lu et al. "CE12: Mapping Functions (Test CE12-1 and CE12-2)," Joint Video Experts Team (JVET) of ITU-t SG 16 WP 3 and ISO/IEC JTC 1/SC 29/WG 11, 13th Meeting, Marrakech, MA, Jan. 9-18, 2019, document JVET-M0427, 2019.

Luo et al. "CF?-Related: Prediction Refinement with Optical Flow for Affine Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0236, 2019.

Seregin et al. "CE5: Summary Report on Adaptive Loop Filter," Joint Video Experts Team (JVET) of ITU-T SG 16 NP 3 and ISO/IEC JTC 1/SC 29/WG 11, 14th Meeting, Geneva, CH, Mar. 19-27, 2019, document JVET-N0025, 2019.

Taquet et al. "Non-Linear Adaptive Loop Filter," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0385, 2019.

Taquet et al. "CE5: Results of Tests CE5-3.1 to CE5-3.4 on Non-Linear Adaptive Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0242, 2019.

International Search Report and Written Opinion from International Patent Application No. PCT/CN2020/085068 dated Jun. 30, 2020 (9 pages).

International Search Report and Written Opinion from International Patent Application No. PCT/CN2020/085075 dated Jul. 15, 2020 (12 pages).

Huang et al. "AHG6: Baseline Options for ALF," Joint Collaborative Team on Video Coding of ISO/IEC JTC1/SC 29/WG 11 and ITU-T SG 16, Apr. 23, 2012, document JCTVC-I0157, 2012. (cited in cited in EP20791885.5 EESR mailed May 13, 2022).

Extended European Search Report from European Patent Application No. 20791885.5 dated May 13, 2022 (9 pages).

Lim et al. "CE2: Subsampled Sum-Modified-Laplacian (test 4.1. 1)," Joint Video Experts Team (JVET) of ITU-T SG 16 WP 3 and ISO/IEC JTC 1/SC 29/WG 11 11th Meeting, Ljubljana, SI, Jul. 10-18, 2018, document JVET-K0164, 2018. (cited in JP2021-559943 OA1 dated Nov. 15, 2022).

* cited by examiner

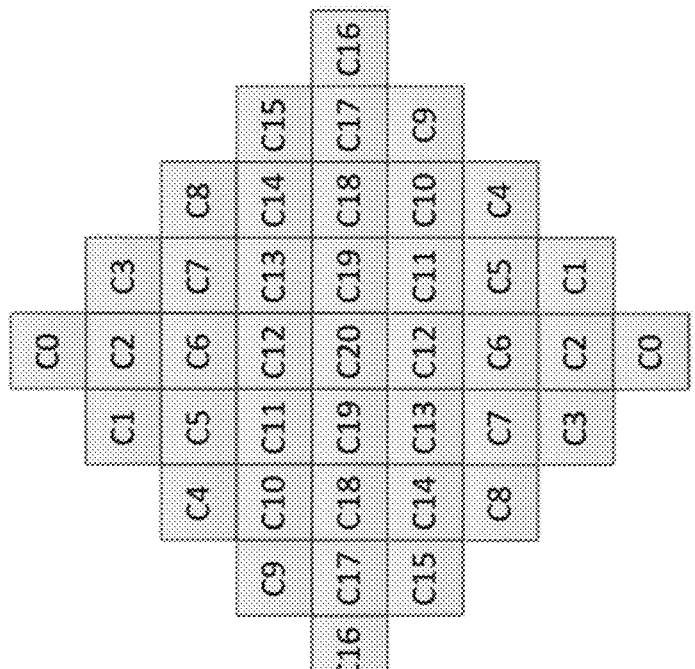
FIG. 2C
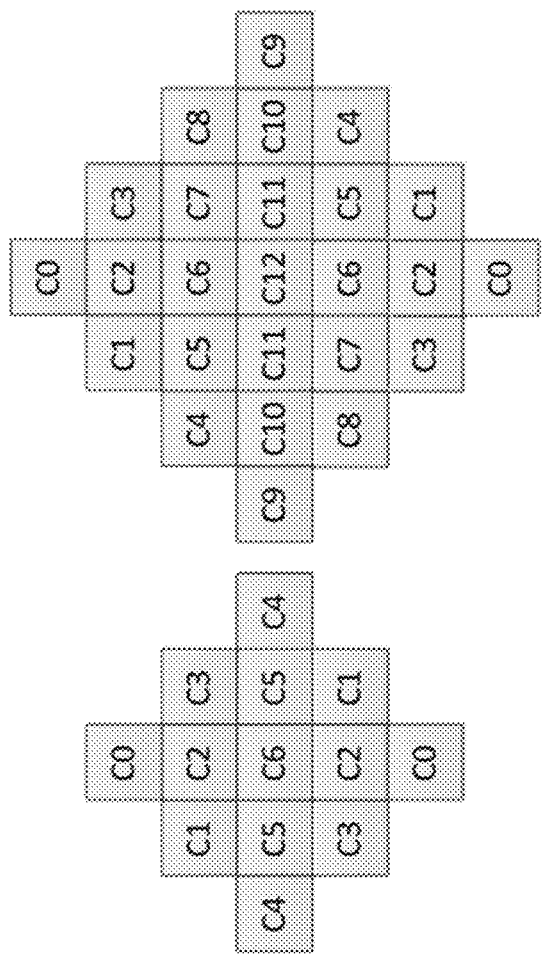
FIG. 2B
FIG. 2A

Determining, for a current video block that is coded with an adaptive loop filter, a number of temporal adaptive loop filtering (ALF) coefficient sets based on available temporal ALF coefficient sets, wherein the available temporal ALF coefficient sets have been encoded or decoded prior to the determining, and wherein the number of ALF coefficient sets is used for a tile group, a tile, a slice, a picture, a coding tree block (CTB), or a video unit comprising the current video block

1144 —

Performing, based on the number of temporal ALF coefficient sets, a conversion between the current video block and a bitstream representation of the current video block

FIG. 11D

ADAPTIVE LOOP FILTERING FOR VIDEO CODING

CROSS-REFERENCE TO RELATED APPLICATIONS

This application is a continuation of International Application No. PCT/CN2020/085075, filed on Apr. 16, 2020, which claims the priority to and benefits of International Patent Application No. PCT/CN2019/082855 filed on Apr. 16, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to adaptive loop filtering for video coding are described. The described methods may be applied to both the existing video coding standards (e.g., High Efficiency Video Coding (HEVC)) and future video coding standards (e.g., Versatile Video Coding (VVC)) or codecs.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

In one representative aspect, the disclosed technology may be used to provide a method for video processing. This method includes performing, for a current video block of a video, a filtering process that uses filter coefficients and comprises two or more operations with at least one intermediate result, applying a clipping operation to the at least one intermediate result, and performing, based on the at least one intermediate result, a conversion between the current video block and a bitstream representation of the video, wherein the at least one intermediate result is based on a weighted sum of the filter coefficients and differences between a current sample of the current video block and neighboring samples of the current sample.

In another representative aspect, the disclosed technology may be used to provide a method for video processing. This method includes encoding a current video block of a video into a bitstream representation of the video, wherein the current video block is coded with an adaptive loop filter (ALF), and selectively including, based on an availability or use of one or more sets of temporal adaptive filters, an indication of a set of temporal adaptive filters within the one or more sets of the temporal adaptive filters in the bitstream representation.

In yet another representative aspect, the disclosed technology may be used to provide a method for video processing. This method includes determining, based on an indication of a set of temporal adaptive filters in a bitstream representation of a video, an availability or use of one or more sets of the temporal adaptive filters comprising the set of temporal adaptive filters applicable to a current video block of the video that is coded with an adaptive loop filter (ALF), and generating a decoded current video block from the bitstream representation by selectively applying, based on the determining, the set of temporal adaptive filters.

In yet another representative aspect, the disclosed technology may be used to provide a method for video processing. This method includes determining, for a current video block that is coded with an adaptive loop filter, a number of temporal adaptive loop filtering (ALF) coefficient sets based on available temporal ALF coefficient sets, wherein the available temporal ALF coefficient sets have been encoded or decoded prior to the determining, and wherein the number of ALF coefficient sets is used for a tile group, a tile, a slice, a picture, a coding tree block (CTB), or a video unit comprising the current video block, and performing, based on the number of temporal ALF coefficient sets, a conversion between the current video block and a bitstream representation of the current video block.

In yet another representative aspect, the disclosed technology may be used to provide a method for video processing. This method includes determining, for a conversion between a current video block of a video and a bitstream representation of the video, that an indication of adaptive loop filtering (ALF) in a header of a video region of the video is equal to an indication of ALF in an adaptive parameter set (APS) network abstraction layer (NAL) unit associated with the bitstream representation, and performing the conversion.

In yet another representative aspect, the disclosed technology may be used to provide a method for video processing. This method includes selectively enabling, for a conversion between a current video block of video and a bitstream representation of the video, a non-linear adaptive loop filtering (ALF) operation based on a type of an adaptive loop filter used by a video region of the video, and performing, subsequent to the selectively enabling, the conversion.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 2A, 2B and 2C show examples of geometry transformation-based adaptive loop filter (GALF) filter shapes.

Figures 4A, 4B:
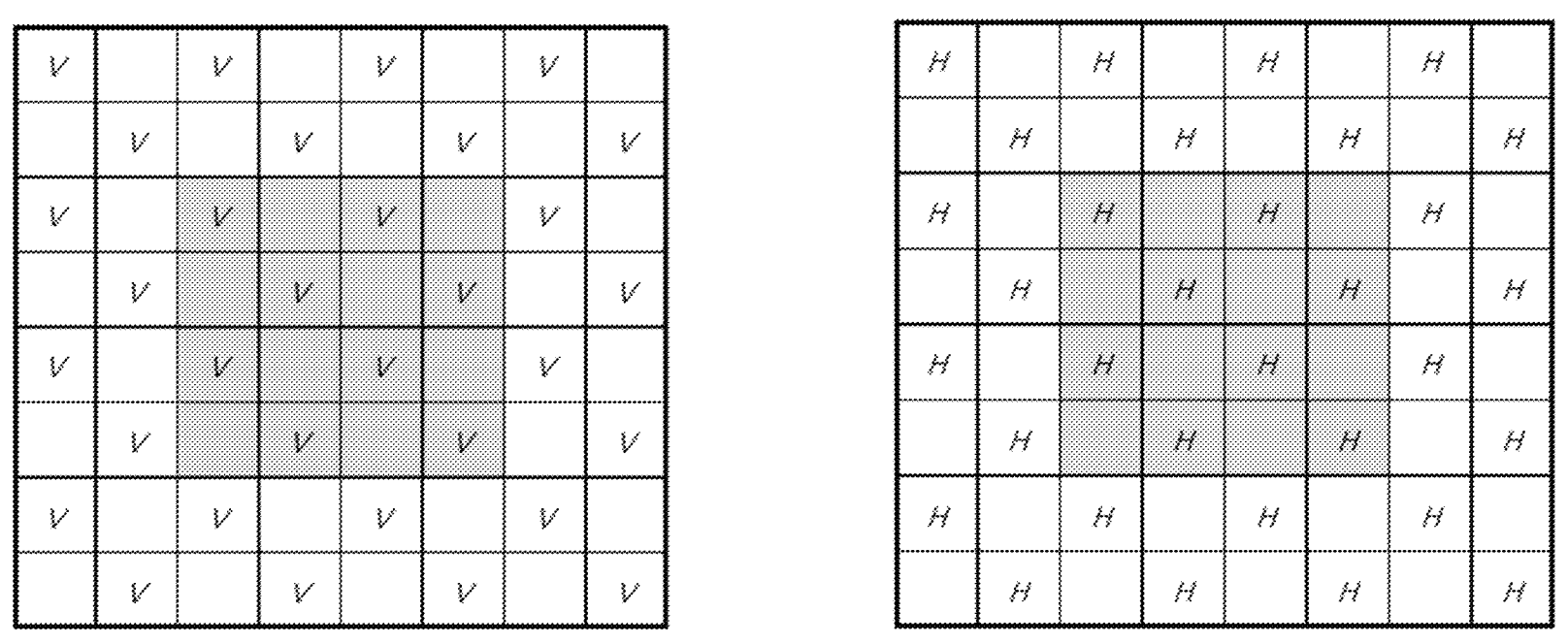
Figures 4C, 4D:
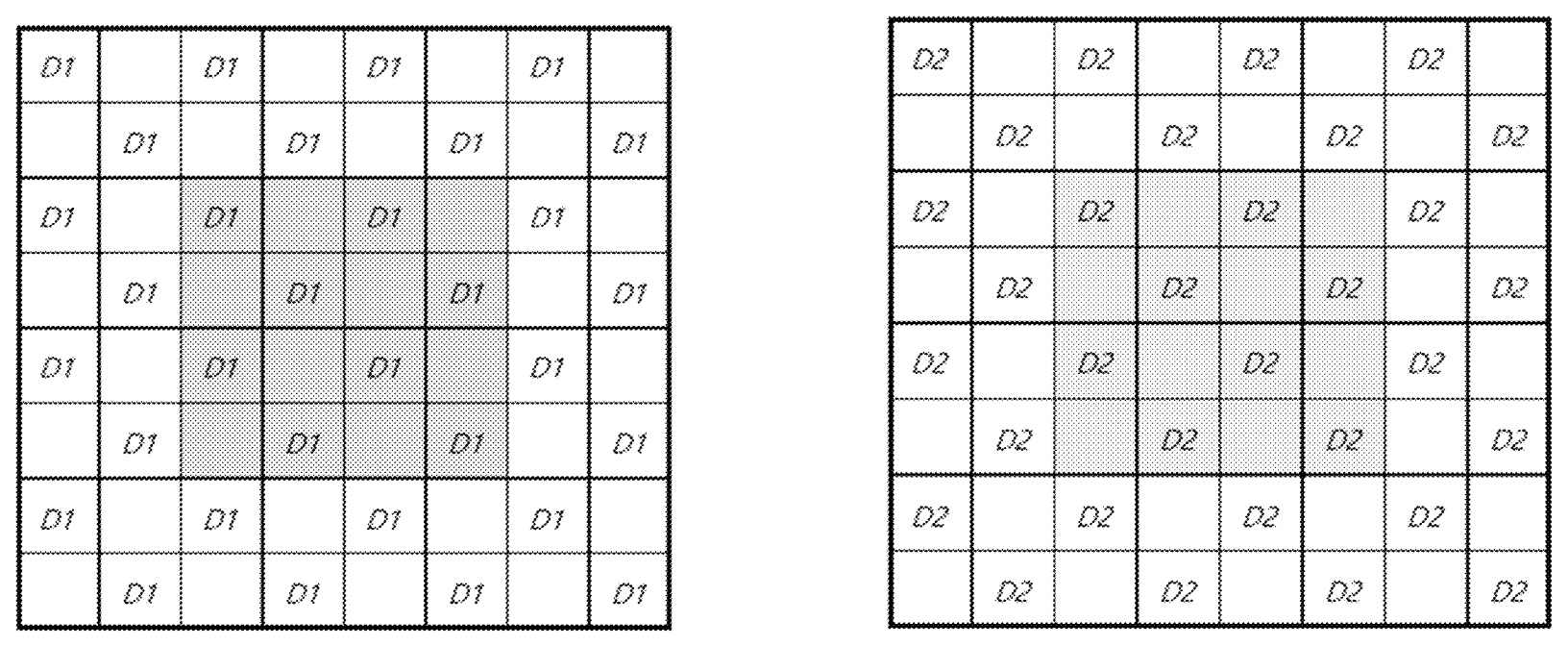

FIGS. 4A-4D show example subsampled Laplacian calculations for adaptive loop filter (ALF) classification.

FIG. 5 shows an example of a luma filter shape.

FIGS. 11A-11F show flowcharts of example methods for adaptive loop filtering, in accordance with the disclosed technology.

DETAILED DESCRIPTION

Figure 1:
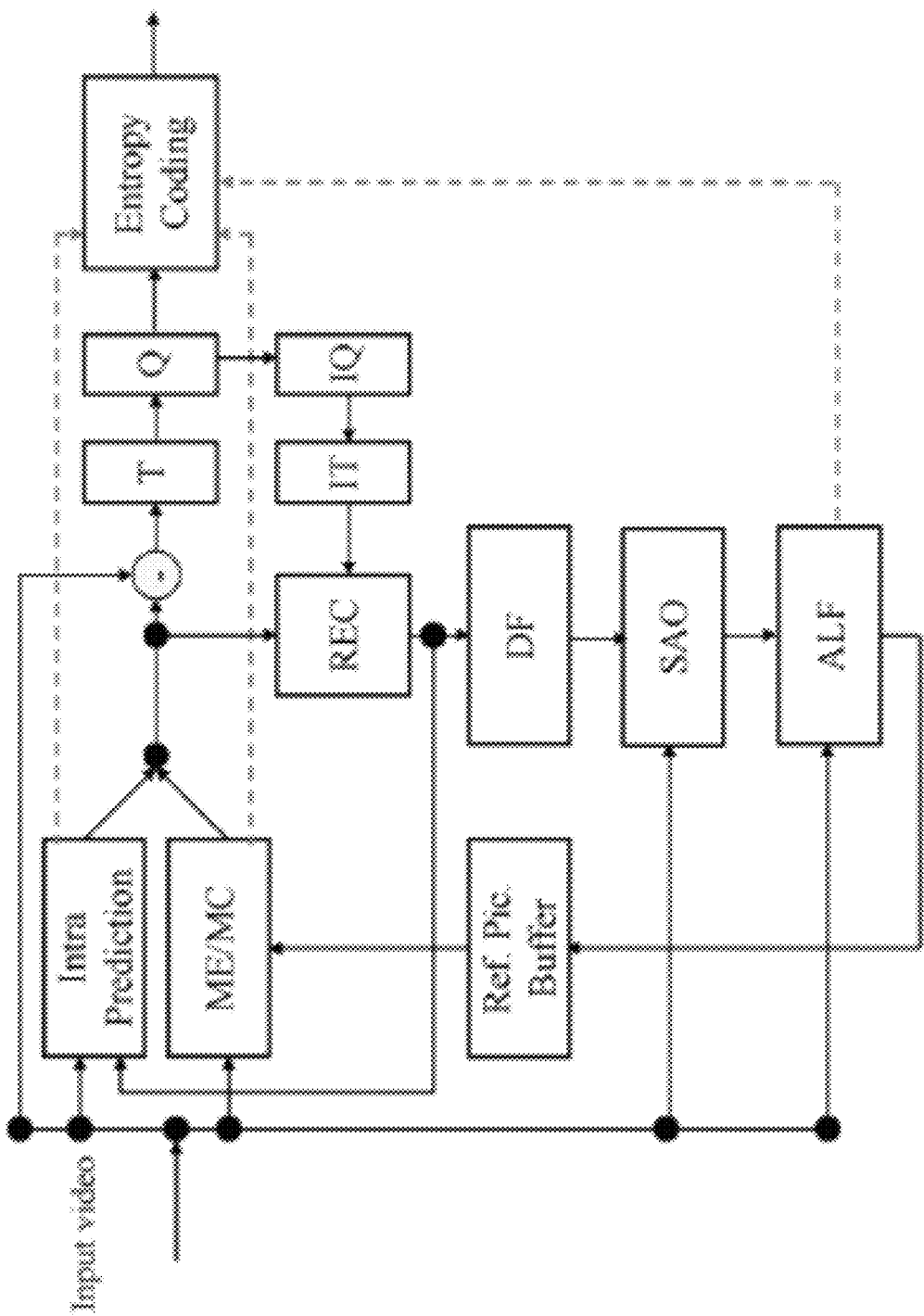
FIG. 1 shows an example of an encoder block diagram for video coding.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Examples of Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

1.1 The 4:4:4 Color Format

Each of the three Y'CbCr components have the same sample rate, thus there is no chroma subsampling. This scheme is sometimes used in high-end film scanners and cinematic post production.

1.2 The 4:2:2 Color Format

The two chroma components are sampled at half the sample rate of luma, e.g. the horizontal chroma resolution is halved. This reduces the bandwidth of an uncompressed video signal by one-third with little to no visual difference.

1.3 The 4:2:0 Color Format

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

2 Examples of the Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

3 Examples of a Geometry Transformation-Based Adaptive Loop Filter in JEM

In the JEM, an geometry transformation-based adaptive loop filter (GALF) with block-based filter adaption [3] is applied. For the luma component, one among 25 filters is selected for each 2×2 block, based on the direction and activity of local gradients.

3.1 Examples of Filter Shape

In the JEM, up to three diamond filter shapes (as shown in FIGS. 2A, 2B and 2C for the 5×5 diamond, 7×7 diamond and 9×9 diamond, respectively) can be selected for the luma component. An index is signalled at the picture level to indicate the filter shape used for the luma component. For chroma components in a picture, the 5×5 diamond shape is always used.

3.1.1 Block Classification
Each 2×2 block is categorized into one out of 25 classes. The classification index C is derived based on its directionality D and a quantized value of activity $\hat{A}$, as follows:

$$C = 5D + \hat{A}. \quad (1)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \; V_{k,l} = |2R(k,l) - R(k,l-1) - R(k,l+1)|, \quad (2)$$

$$g_h = \sum_{k=i-2}^{i+3} \sum_{l=j-2}^{j+3} H_{k,l}, \; H_{k,l} = |2R(k,l) - R(k-,l) - R(k+1,l)|, \quad (3)$$

$$g_{d1} = \sum_{k=i-2}^{i+3} \sum_{l=j-2}^{j+3} D1_{k,l}, \quad (4)$$

$$D1_{k,l} = |2R(k,l) - R(k-1,l-1) - R(k+1,l+1)|$$

$$g_{d2} = \sum_{k=i-2}^{i+3} \sum_{j=j-2}^{j+3} D2_{k,l}, \quad (5)$$

$$D2_{k,l} = |2R(k,l) - R(k-1,l+1) - R(k+1,l-1)|$$

Indices i and j refer to the coordinates of the upper left sample in the 2×2 block and R(i, j) indicates a reconstructed sample at coordinate (i, j).
Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:
Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.
Step 2. If $g_{h,v}^{max}/g_{h,v}^{min} > g_{d0,d1}^{max}/g_{d0,d1}^{min}$, continue from Step 3; otherwise continue from Step 4.
Step 3. If $g_{h,v}^{max} > t_2 \cdot g_{h,v}^{min}$, D is set to 2; otherwise D is set to 1.
Step 4. If $g_{d0,d1}^{max} > t_2 \cdot g_{d0,d1}^{min}$, D is set to 4; otherwise D is set to 3.
The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as $\hat{A}$. For both chroma components in a picture, no classification method is applied, i.e. a single set of ALF coefficients is applied for each chroma component.
3.1.2 Geometric Transformations of Filter Coefficients
Before filtering each 2×2 block, geometric transformations such as rotation or diagonal and vertical flipping are applied to the filter coefficients f(k, l) depending on gradient values calculated for that block. This is equivalent to applying these transformations to the samples in the filter support region. The idea is to make different blocks to which ALF is applied more similar by aligning their directionality.
Three geometric transformations, including diagonal, vertical flip and rotation are introduced:

Diagonal: $f_D(k,l) = f(l,k)$

Vertical flip: $f_V(k,l) = f(k, K-l-1)$,

Rotation: $f_R(k,l) = f(K-l-1, k)$. (9)

Herein, K is the size of the filter and 0≤k, l≤K−1 are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 1.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

3.1.3 Signaling of Filter Parameters
In the JEM, GALF filter parameters are signaled for the first CTU, i.e., after the slice header and before the SAO parameters of the first CTU. Up to 25 sets of luma filter coefficients could be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signaling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signaling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f(k,l) can still be sent for this class in which case the coefficients of the filter which will be applied to the reconstructed image are sum of both sets of coefficients.

The filtering process of luma component can controlled at CU level. A flag is signaled to indicate whether GALF is applied to the luma component of a CU. For chroma component, whether GALF is applied or not is indicated at picture level only.

3.1.4 Filtering Process

At decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j)=\Sigma_{k=-L/2}^{L/2}\Sigma_{l=-L/2}^{L/2}f(k,l)\times R(i+k,j+l) \qquad (10)$$

3.1.5 Determination Process for Encoder Side Filter Parameters

Figure 3:
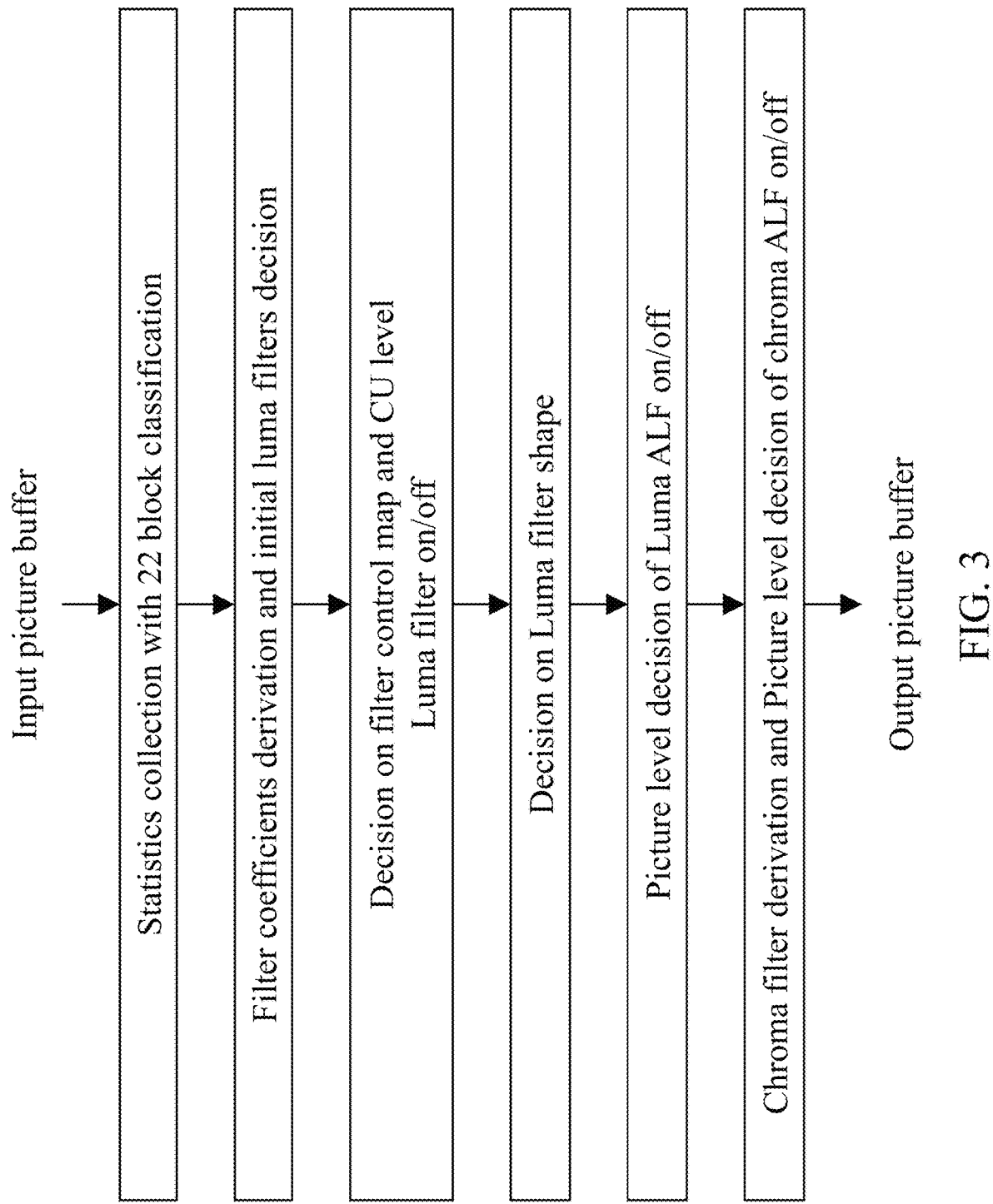
FIG. 3 shows an example of a flow graph for a GALF encoder decision.

Overall encoder decision process for GALF is illustrated in FIG. 3. For luma samples of each CU, the encoder makes a decision on whether or not the GALF is applied and the appropriate signalling flag is included in the slice header. For chroma samples, the decision to apply the filter is done based on the picture-level rather than CU-level. Furthermore, chroma GALF for a picture is checked only when luma GALF is enabled for the picture.

4 Examples of a Geometry Transformation-Based Adaptive Loop Filter in VVC

The current design of GALF in VVC has the following major changes compared to that in JEM:
1) The adaptive filter shape is removed. Only 7×7 filter shape is allowed for luma component and 5×5 filter shape is allowed for chroma component.
2) Temporal prediction of ALF parameters and prediction from fixed filters are both removed.
3) For each CTU, one bit flag is signaled whether ALF is enabled or disabled.
4) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

5 Examples of a Region-Based Adaptive Loop Filter in AVS2

ALF is the last stage of in-loop filtering. There are two stages in this process. The first stage is filter coefficient derivation. To train the filter coefficients, the encoder classifies reconstructed pixels of the luminance component into 16 regions, and one set of filter coefficients is trained for each category using wiener-hopf equations to minimize the mean squared error between the original frame and the reconstructed frame. To reduce the redundancy between these 16 sets of filter coefficients, the encoder will adaptively merge them based on the rate-distortion performance. At its maximum, 16 different filter sets can be assigned for the luminance component and only one for the chrominance components. The second stage is a filter decision, which includes both the frame level and LCU level. Firstly the encoder decides whether frame-level adaptive loop filtering is performed. If frame level ALF is on, then the encoder further decides whether the LCU level ALF is performed.

5.1 Filter Shape

Figure 5:
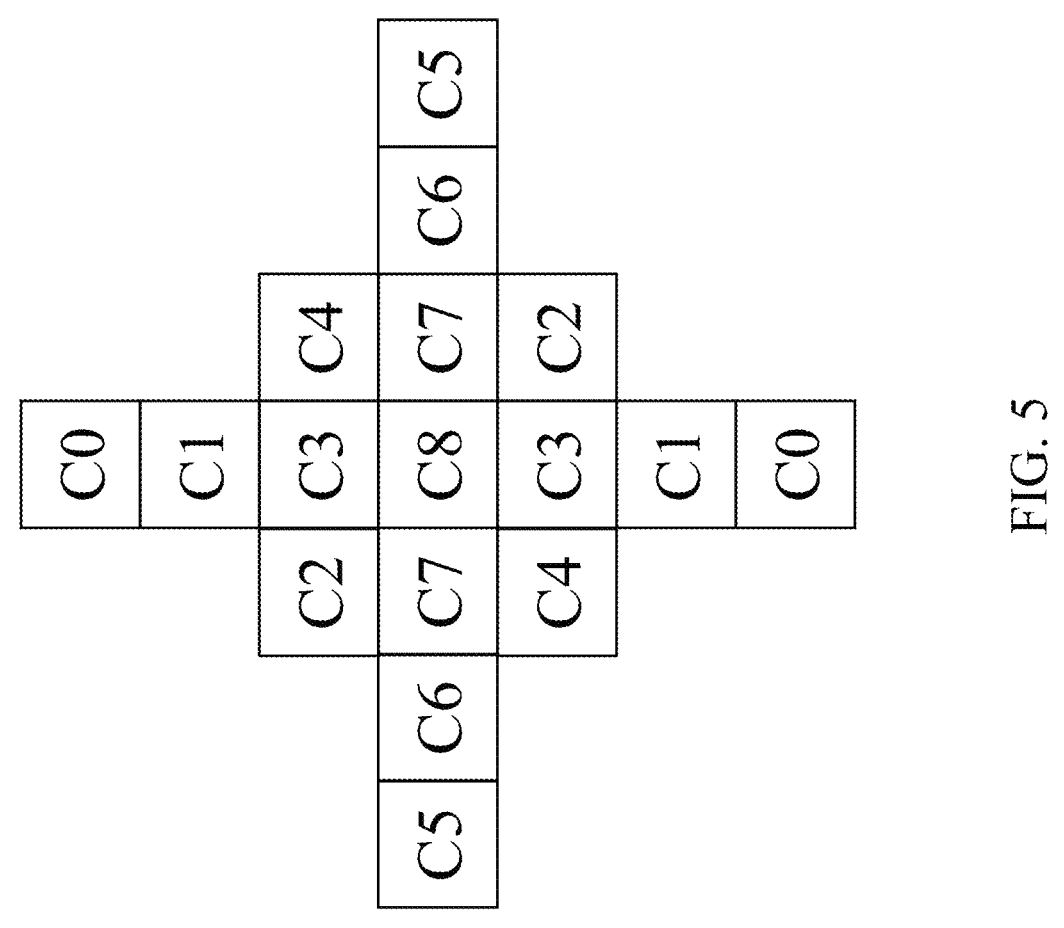

The filter shape adopted in AVS-2 is a 7×7 cross shape superposing a 3×3 square shape, just as illustrated in FIG. 5 for both luminance and chroma components. Each square in FIG. 5 corresponds to a sample. Therefore, a total of 17 samples are used to derive a filtered value for the sample of position C8. Considering overhead of transmitting the coefficients, a point-symmetrical filter is utilized with only nine coefficients left, {C0, C1, . . . , C8}, which reduces the number of filter coefficients to half as well as the number of multiplications in filtering. The point-symmetrical filter can also reduce half of the computation for one filtered sample, e.g., only 9 multiplications and 14 add operations for one filtered sample.

5.2 Region-Based Adaptive Merge

Figure 6:
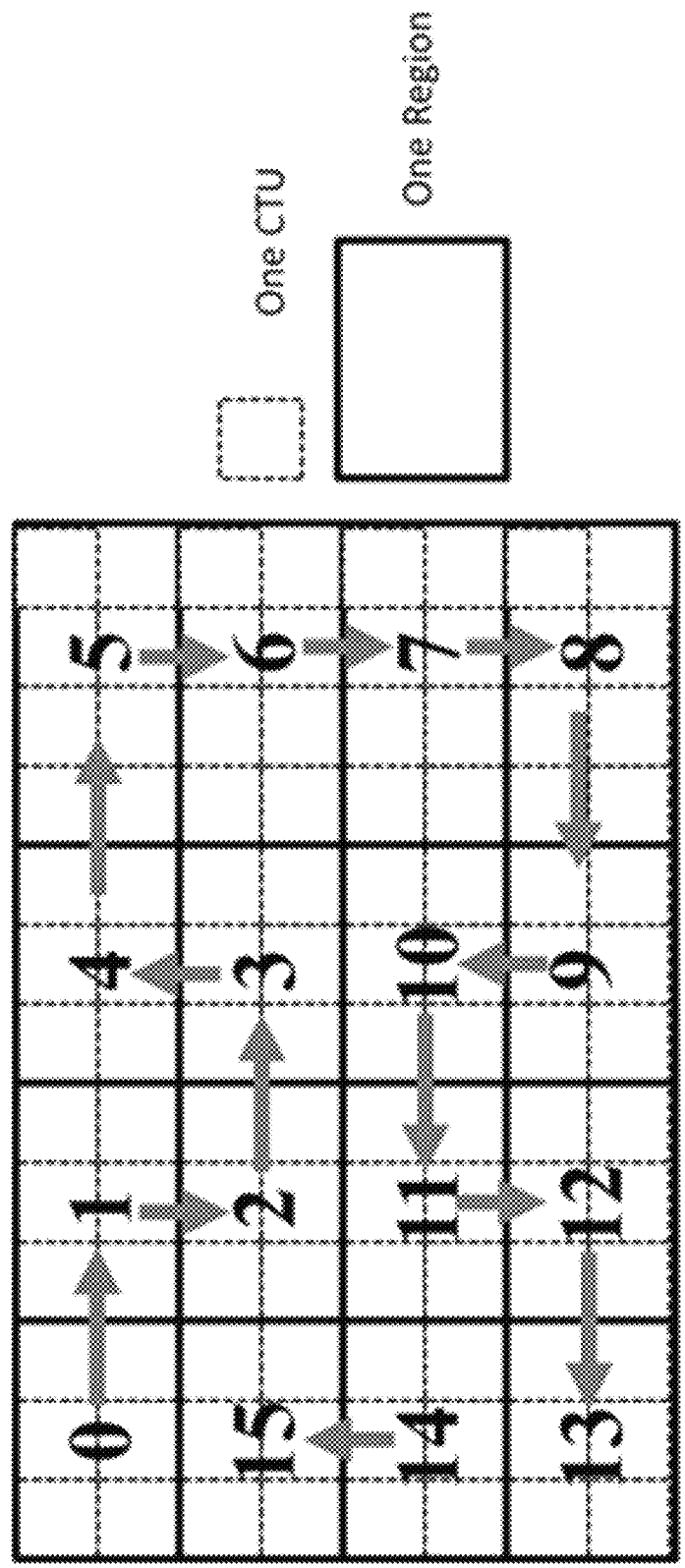
FIG. 6 shows an example of region division of a Wide Video Graphic Array (WVGA) sequence.

In order to adapt different coding errors, AVS-2 adopts region-based multiple adaptive loop filters for luminance component. The luminance component is divided into 16 roughly-equal-size basic regions where each basic region is aligned with largest coding unit (LCU) boundaries as shown in FIG. 6, and one Wiener filter is derived for each region. The more filters are used, the more distortions are reduced, but the bits used to encode these coefficients increase along with the number of filters. In order to achieve the best rate-distortion performance, these regions can be merged into fewer larger regions, which share the same filter coefficients. In order to simplify the merging process, each region is assigned with an index according to a modified Hilbert order based on the image prior correlations. Two regions with successive indices can be merged based on rate-distortion cost.

The mapping information between regions should be signaled to the decoder. In AVS-2, the number of basic regions is used to represent the merge results and the filter coefficients are compressed sequentially according to its region order. For example, when {0, 1}, {2, 3, 4}, {5, 6, 7, 8, 9} and the left basic regions merged into one region respectively, only three integers are coded to represent this merge map, i.e., 2, 3, 5.

5.3 Signaling of Side Information

Multiple switch flags are also used. The sequence switch flag, adaptive_loop_filter_enable, is used to control whether adaptive loop filter is applied for the whole sequence. The image switch flags, picture_alf_enble[i], control whether ALF is applied for the corresponding ith image component. Only if the picture_alf_enble[i] is enabled, the corresponding LCU-level flags and filter coefficients for that color component will be transmitted. The LCU level flags, lcu_alf_enable[k], control whether ALF is enabled for the corresponding kth LCU, and are interleaved into the slice data. The decision of different level regulated flags is all based on the rate-distortion cost. The high flexibility further makes the ALF improve the coding efficiency much more significantly.

In some embodiments, and for a luma component, there could be up to 16 sets of filter coefficients.

In some embodiments, and for each chroma component (Cb and Cr), one set of filter coefficients may be transmitted.

6 GALF in VTM-4

In VTM4.0, the filtering process of the Adaptive Loop Filter, is performed as follows:

$$O(x,y) = \Sigma_{(i,j)} w(i,j) \cdot I(x+i, y+j) \quad (11)$$

where samples $I(x+i, y+j)$ are input samples, $O(x, y)$ is the filtered output sample (i.e. filter result), and $w(i, j)$ denotes the filter coefficients. In practice, in VTM4.0 it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \cdot I(x+i, y+j) + 64 \right) >> 7 \quad (12)$$

where L denotes the filter length, and where $w(i, j)$ are the filter coefficients in fixed point precision.

7 Non-Linear Adaptive Loop Filtering (ALF)

7.1 Filtering Reformulation

Equation (11) can be reformulated, without coding efficiency impact, in the following expression:

$$O(x,y) = I(x,y) + \Sigma_{(i,j) \neq (0,0)} w(i,j) \cdot (I(x+i, y+j) - I(x,y)) \quad (13)$$

Herein, $w(i, j)$ are the same filter coefficients as in equation (11) [excepted $w(0, 0)$ which is equal to 1 in equation (13) while it is equal to $1 - \Sigma_{(i,j) \neq (0, 0)} w(i, j)$ in equation (11)].

7.2 Modified Filter

Using this above filter formula of (13), we can easily introduce non linearity to make ALF more efficient by using a simple clipping function to reduce the impact of neighbor sample values ($I(x+i, y+j)$) when they are too different with the current sample value ($I(x, y)$) being filtered.

In this proposal, the ALF filter is modified as follows:

$$O'(x,y) = I(x,y) + \Sigma_{(i,j) \neq (0,0)} w(i,j) \cdot K(I(x+i, y+j) - I(x,y), k(i, j)) \quad (14)$$

Herein, $K(d, b) = \min(b, \max(-b, d))$ is the clipping function, and $k(i, j)$ are clipping parameters, which depends on the $(i, j)$ filter coefficient. The encoder performs the optimization to find the best $k(i, j)$.

In the JVET-N0242 implementation, the clipping parameters $k(i, j)$ are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, we limit the evaluation of the clipping values to a small set of possible values. In the proposal, we only use 4 fixed values which are the same for INTER and INTRA tile groups.

Because the variance of the local differences is often higher for Luma than for Chroma, we use two different sets for the Luma and Chroma filters. We also include the maximum sample value (here 1024 for 10 bits bit-depth) in each set, so that clipping can be disabled if it is not necessary.

The sets of clipping values used in the JVET-N0242 tests are provided in the Table 2. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round}\left( \left( M^{\frac{1}{N}} \right)^{N-n+1} \right) \text{ for } n \in 1 .. N \right\},$$

with $M = 2^{10}$ and $N = 4$.

Similarly, the Chroma tables of clipping values is obtained according to the following formula:

$$AlfClip_C = \left\{ \text{round}\left( A \cdot \left( \left( \frac{M}{A} \right)^{\frac{1}{N-1}} \right)^{N-n} \right) \text{ for } n \in 1 .. N \right\},$$

with $M = 2^{10}$, $N = 4$ and $A = 4$.

TABLE 2

| Authorized clipping values | |
|---|---|
| | INTRA/INTER tile group |
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 2. This encoding scheme is the same as the encoding scheme for the filter index.

8 CTU-Based ALF in JVET-N0415

Slice-Level Temporal Filter.

Adaptive parameter set (APS) was adopted in VTM4. Each APS contains one set of signaled ALF filters, up to 32 APSs are supported. In the proposal, slice-level temporal filter is tested. A tile group can re-use the ALF information from an APS to reduce the overhead. The APSs are updated as a first-in-first-out (FIFO) buffer.

CTB Based ALF.

For luma component, when ALF is applied to a luma CTB, the choice among 16 fixed, 5 temporal or 1 signaled filter sets is indicated. Only the filter set index is signaled. For one slice, only one new set of 25 filters can be signaled. If a new set is signaled for a slice, all the luma CTBs in the same slice share that set. Fixed filter sets can be used to predict the new slice-level filter set and can be used as candidate filter sets for a luma CTB as well. The number of filters is 64 in total.

For chroma component, when ALF is applied to a chroma CTB, if a new filter is signaled for a slice, the CTB used the new filter, otherwise, the most recent temporal chroma filter satisfying the temporal scalability constrain is applied.

As the slice-level temporal filter, the APSs are updated as a first-in-first-out (FIFO) buffer.

Specification.

The following text is modified based on JVET-K1001-v6 with {{fixed filter}}, [[temporal filters]] and ((CTB-based filter index)), i.e., using double braces, double brackets and double parentheses 7.3.3.2 Adaptive Loop Filter Data Syntax

|  | Descriptor |
|---|---|
| alf_data( ) { |  |
|   alf_chroma_idc | tu (v) |
| (( alf_signal_new_filter_luma | u (1) |
|   if( alf_signal_new_filter_luma > 0 ) { )) |  |
| {{ alf_luma_use_fixed_filter_flag | u (1) |
|   if(alf_luma_use_fixed_filter_flag) { |  |
|     alf_luma_fixed_filter_set_index | tb (v) |
|     alf_luma_fixed_filter_usage_pattern | u (1) |
|     if (alf_luma_fixed_filter_usage_pattern > 0) |  |
|       for (i = 0; i < NumAlfFilters; i++) |  |
|         alf_luma_fixed_filter_usage[i] | u (1) }} |
| (( alf_num_available_temporal_filter_sets_luma | tb (1) )) |
| alf_luma_num_filters_signalled_minus1 | tb (v) |
| alf_luma_type_flag | u (1) |
| if( alf_luma_num_filters_signalled_minus1 > 0 ) { |  |
|   for( filtIdx = 0; filtIdx < NumAlfFilters; filtIdx++) |  |
|     alf_luma_coeff_delta_idx[ filtIdx ] | tu (v) |
| } |  |
| alf_luma_coeff_delta_flag | u (1) |
| if ( !alf_luma_coeff_delta_flag && alf_luma_num_filters_signalled_minus1 > 0 ) |  |
|   alf_luma_coeff_delta_prediction_flag | u (1) |
| alf_luma_min_eg_order_minus1 | tu (v) |
| for( i = 0; i < ( alf_luma_type_flag = =1 ) ? 2 : 3; i++) |  |
|   alf_luma_eg_order_increase_flag[ i ] | u (1) |
| if ( alf_luma_coeff_delta_flag ) { |  |
|   for( sigFiltIdx = 0; sigFiltIdx <= alf_luma_num_filters_signalled_minus1; sigFiltIdx++ ) |  |
|     alf_luma_coeff_flag[ sigFiltIdx ] | u (1) |
| } |  |
| for( sigFiltIdx = 0; sigFiltIdx <= alf_luma_num_filters_signalled_minus1; sigFiltIdx++){ |  |
|   if ( alf_luma_coeff_flag[ sigFiltIdx ] ) { |  |
|     for ( j = 0;j < ( alf_luma_type_flag = =1 ) ? 6: 12; j++ ) { |  |
|       alf_luma_coeff_delta_abs[ sigFiltIdx ][ j ] | uek (v) |
|       if( alf_luma_coeff_delta_abs[ sigFiltIdx ][ j ] ) |  |
|         alf_luma_coeff_delta_sign[ sigFiltIdx ][ j ] | u (1) |
|     } |  |
|   } |  |
| } |  |
| (( } )) |  |
| if ( alf_chroma_idc > 0 ) { |  |
| (( alf_signal_new_filter_chroma | u (1) |
|   if (alf_signal_new_filter_chroma){ )) |  |
|     alf_chroma_min_eg_order_minus1 | tu (v) |
|     for( 1 = 0; 1 < 2; i++ ) |  |
|       alf_chroma_eg_order_increase_flag[ i ] | u (1) |
|     for( j = 0; j < 6; j++ ) { |  |
|       alf_chroma_coeff_abs[ j ] | uek (v) |
|       if( alf_chroma_coeff_abs[ j ] > 0) |  |
|         alf_chroma_coeff_sign[ j ] | u (1) |
|     } |  |
| (( } )) |  |
|   } |  |
| } |  |

7.3.4.2 Coding Tree Unit Syntax

|  | Descriptor |
|---|---|
| ```
coding_tree_unit( ) {
  xCtb = ( CtbAddrInRs % PicWidthInCtbsY ) << CtbLog2SizeY
  yCtb = ( CtbAddrInRs / PicWidthInCtbsY ) << CtbLog2SizeY
  if( slice_alf_enable_flag ){
    alf_ctb_flag[ 0 ][ xCtb >> Log2CtbSize ][ yCtb >> Log2CtbSize ]
    if (alf_ctb_flag[ 0 ][ xCtb >> Log2CtbSize ][ yCtb >> Log2CtbSize ]{
(( coding_alf_ctu_filter_set_index(CtbAddrInRs ) ))
    }
    if( alf_chroma_idc = = 1 | | alf_chroma_idc = = 3 )
      alf_ctb_flag[ 1 ][ xCtb >> Log2CtbSize ][ yCtb >> Log2CtbSize ]
    if( alf_chroma_idc = = 2 | | alf_chroma_idc = = 3 )
      alf_ctb_flag[ 2 ][ xCtb >> Log2CtbSize ][ yCtb >> Log2CtbSize ]
  }
  if( slice_type = = I && qtbtt_dual_tree_intra_flag ) {
    dual_tree_implicit_qt_split ( xCtb, yCtb, CtbLog2SizeY, 0 )
  else
    coding_quadtree( xCtb, yCtb, CtbLog2SizeY, 0, SINGLE_TREE )
}
``` | <br><br>ae (v)<br><br><br>ae (v)<br><br>ae (v) |

|  | Descriptor |
|---|---|
| ```
(( coding_alf_ctu_filter_set_index(CtbAddrInRs, slice_type ){ ))
  xCtb = ( CtbAddrInRs % PicWidthInCtbsY ) << CtbLog2SizeY
  yCtb = ( CtbAddrInRs / PicWidthInCtbsY ) << CtbLog2SizeY
alf_use_new_filter
  if (alf_use_new_filter = = 0){
    alf_use_fixed_filter
}
if (alf_use_new_filter){
  alf_luma_ctb_filter_set_index[ xCtb >> Log2CtbSize ][ yCtb >> Log2CtbSize ] = 16
}
  else if (alf_use_fixed_filter){
    alf_fixed_filter_index
  alf_luma_ctb_filter_set_index[ xCtb >> Log2CtbSize ][ yCtb >> Log2CtbSize ] =
alf_fixed_filter_index
}
else{
  alf_temporal_index
  alf_luma_ctb_filter_set_index[ xCtb >> Log2CtbSize ][ yCtb >> Log2CtbSize ] =
16 + alf_temporal_index
}
``` | <br><br><br>ae (1)<br><br>ae (1)<br><br><br><br><br><br>tb (v)<br><br><br><br>tb (v) |

7.4.4.2 Adaptive Loop Filter Data Semantics ((alf_signal_new_filter_luma)) equal to 1 specifies a new luma filter set is signalled. alf_signal_new_filter_luma equal to 0 specifies a new luma filter set is not signalled. It is 0 when not present.

{{alf_luma_use_fixed_filter_flag}} equal to 1 specifies that fixed filter set is used to signal adaptive loop filter. alf_luma_use_fixed_filter_flag equal to 0 specifies that fixed filter set is not used to signal adaptive loop filter.

{{alf_luma_fixed_filter_set_index}} specifies the fixed filter set index. It can be 0 . . . 15.

{{alf_luma_fixed_filter_usage_pattern}} equal to 0 specifies all new filters use fixed filter. alf_luma_fixed_filter_usage_pattern equal to 1 specifies some of new filters use fixed filter and others don't.

{{alf_luma_fixed_filter_usage[i]}} equal to 1 specifies ith filter uses fixed filter. alf_luma_fixed_filter_usage[i] equal to 0 specifies ith filter does not use fixed filter. When it is not present, it is inferred to 1.

((alf_signal_new_filter_chroma)) equal to 1 specifies a new chroma filter is signalled. alf_signal_new_filter_chroma equal to 0 specifies a new chroma filter is not signalled.

((alf_num_available_temporal_filter_sets_luma)) specifies the number of available temporal filter sets that can be used for current slice, it can be from 0 . . . 5. It is 0 when not present.

The variable alf_num_available_filter_sets is derived as 16+alf_signal_new_filter_luma+alf_num_available_temporal_filter_sets_luma.

((If alf_signal_new_filter_luma is 1, the following process)) The variable filterCoefficients[sigFiltIdx][j] with sigFiltIdx=0 . . . alf_luma_num_filters_signalled_minus1, j=0 . . . 11 is initialized as follows:

filterCoefficients[ sigFiltIdx ][ j ] = alf_luma_coeff_delta_abs[ sigFiltIdx ][ j ] * (7-50)
( 1 − 2 * alf_luma_coeff_delta_sign[ sigFiltIdx ][ j ] )

When alf_luma_coeff_delta_prediction_flag is equal 1, filterCoefficients[sigFiltIdx][j] with sigFiltIdx=1 . . . alf_luma_num_filters_signalled_minus1 and j=0 . . . 11 are modified as follows:

filterCoefficients[sigFiltIdx][*j*]+=filterCoefficients [sigFiltIdx−1][*j*] (7-51)

The luma filter coefficients $AlfCoeff_L$ with elements $AlfCoeff_L$[filtIdx][j], with filtIdx=0 . . . NumAlfFilters−1 and j=0 . . . 11 are derived as follows $AlfCoeff_L$[filtIdx][*j*]=filterCoefficients[alf_luma_coeff_delta_idx[filtIdx]][*j*] (7-52)

{{if alf_luma_use_fixed_filter_flag is 1 and alf_luma_fixed_filter_usage[filtidx] is 1, the following applies:

$AlfCoeff_L$[filtIdx ][ j ] = $AlfCoeff_L$[filtIdx ][ j ] +
AlfFixedFilterCoeff[ AlfClassToFilterMapping[ alf_luma_fixed_filter_index ][ filtidx ] ][ j ] }}

The last filter coefficients $AlfCoeff_L$[filtIdx][12] for filtIdx=0 . . . NumAlfFilters−1 are derived as follows:

$AlfCoeff_L$[filtIdx][12]=128−$\Sigma_k$($AlfCoeff_L$[filtIdx] [*k*]<<1), with *k*=0 . . . 11 (7-53)

It is a requirement of bitstream conformance that the values of $AlfCoeff_L$[filtIdx][j] with filtIdx=0 . . . NumAlfFilters−1, j=0 . . . 11 shall be in the range of $-2^7$ to $2^7-1$, inclusive and that the values of $AlfCoeff_L$[filtIdx][12] shall be in the range of 0 to $2^8-1$, inclusive.
((The luma filter coefficients)) $AlfCoeff_{LumaAll}$ with elements $AlfCoeff_{LumaAll}$[filtSetIdx][filtIdx][j], with filtSetIdx=0 . . . 15, filtSetIdx=0 . . . NumAlfFilters−1 and j=0 . . . 12 are derived as follows $AlfCoeff_{LumaAll}$[ filtSetIdx ][ filtIdx ][ j ] = {{ AlfFixedFilterCoeff[ AlfClassToFilterMapping[ }} filtSetIdx {{ ][ filtidx ] ][ j ] }}

((The luma filter coefficients)) $AlfCoeff_{LumaAll}$ with elements $AlfCoeff_{LumaAll}$[filtSetIdx][filtIdx][j], with filtSetIdx=16, filtSetIdx=0 . . . NumAlfFilters−1 and j=0 . . . 12 are derived as follows
Variable closest_temporal_index is initialized as −1. Tid is the temporal layer index of current slice.

(( if alf_signal_new_filter_luma is 1 ))
$AlfCoeff_{LumaAll}$[ 16 ][ filtIdx ][ j ] = $AlfCoeff_L$[ filtIdx ][ j ]
(( otherwise, the following process is invoked ))
for (i = Tid; i >= 0; i−−)
{
    for (k = 0; k < temp_size_L; k++)
    {
        if (temp$_{Tid\_L}$[ k ] == i)
        {
            closest_temporal_index is set as k;
            break;
        }
    }
}
$AlfCoeff_{LumaAll}$[ 16 ][ filtIdx ][ j ] = Temp$_L$[ closest_temporal_index ][ filtIdx ][ j ]

((The luma filter coefficients)) $AlfCoeff_{LumaAll}$ with elements $AlfCoeff_{LumaAll}$[filtSetIdx][filtIdx][j], with filtSetIdx=17 . . . alf_num_available_filter_sets−1, filtSetIdx=0 . . . NumAlfFilters−1 and j=0 . . . 12 are derived as follows i = 17;
for (k = 0; k < temp_size_L and i < alf_num_available_filter_sets; j++)
{
    if (temp$_{Tid\_L}$[ k ] <= Tid and k is not equal to closest_temporal_index)
    {
        $AlfCoeff_{LumaAll}$[ i ][ filtIdx ][ j ] = Temp$_L$[ k ][ filtIdx ][ j ];
        i++;
    }
}

{{*AlfFixedFilterCoeff*}}[64][13] =

{{0, 0, 2, −3, 1, −4, 1, 7, −1, 1, −1, 5, 112},

{0, 0, 0, 0, 0, −1, 0, 1, 0, 0, −1, 2, 126},

{0, 0, 0, 0, 0, 0, 0, 1, 0, 0, 0, 0, 126},

{0, 0, 0, 0, 0, 0, 0, 0, 0, −1, 1, 128},

-continued

{2, 2, −7, −3, 0, −5, 13, 22, 12, −3, −3, 17, 34},

{−1, 0, 6, −8, 1, −5, 1, 23, 0, 2, −5, 10, 80},

{0, 0, −1, −1, 0, −1, 2, 1, 0, 0, −1, 4, 122},

{0, 0, 3, −11, 1, 0, −1, 35, 5, 2, −9, 9, 60},

{0, 0, 8, −8, −2, −7, 4, 4, 2, 1, −1, 25, 76},

{0, 0, 1, −1, 0, −3, 1, 3, −1, 1, −1, 3, 122},

{0, 0, 3, −3, 0, −6, 5, −1, 2, 1, −4, 21, 92},

{−7, 1, 5, 4, −3, 5, 11, 13, 12, −8, 11, 12, 16},

{−5, −3, 6, −2, −3, 8, 14, 15, 2, −7, 11, 16, 24},

{2, −1, −6, −5, −2, −2, 20, 14, −4, 0, −3, 25, 52},

{3, 1, −8, −4, 0, −8, 22, 5, −3, 2, −10, 29, 70},

{2, 1, −7, 1, 2, −11, 23, −5, 0, 2, −10, 29, 78},

{−6, −3, 8, 9, −4, 8, 9, 7, 14, −2, 8, 9, 14},

{2, 1, −4, −7, 0, −8, 17, 22, 1, −1, −4, 23, 44},

{3, 0, −5, −7, 0, −7, 15, 18, −5, 0, −5, 27, 60},

{2, 0, 0, −7, 1, −10, 13, 13, −4, 2, −7, 24, 74},

{3, 3, −13, 4, −2, −5, 9, 21, 25, −2, −3, 12, 24},

{−5, −2, 7, −3, −7, 9, 8, 9, 16, −2, 15, 12, 14},

{0, −1, 0, −7, −5, 4, 11, 11, 8, −6, 12, 21, 32},

{3, −2, −3, −8, −4, −1, 16, 15, −2, −3, 3, 26, 28},

{2, 1, −5, −4, −1, −8, 16, 4, −2, 1, −7, 33, 68},

{2, 1, −4, −2, 1, −10, 17, −2, 0, 2, −11, 33, 74},

{1, −2, 7, −15, −16, 10, 8, 8, 20, 11, 14, 11, 14},

{2, 2, 3, −13, −13, 4, 8, 12, 2, −3, 16, 24, 40},

{1, 4, 0, −7, −7, −4, 9, 9, −2, −2, 8, 29, 54},

{1, 1, 2, −4, −1, −6, 6, 2, −1, −1, −3, 30, 74},

{−7, 3, 2, 10, −2, 3, 7, 11, 19, −7, 8, 10, 14},

{0, −2, −5, −3, −2, 4, 20, 15, −1, −3, −1, 22, 40},

{3, −1, −8, −4, −1, −4, 22, 8, −4, 2, −8, 28, 62},

{0, 3, −14, 3, 0, 1, 19, 17, 8, −3, −7, 20, 34},

{0, 2, −1, −8, 3, −6, 5, 21, 1, 1, −9, 13, 84},

{−4, −2, 8, 20, −2, 2, 3, 5, 21, 4, 6, 1, 4},

{2, −2, −3, −9, −4, 2, 14, 16, 3, −6, 8, 24, 38},

{2, 1, 5, −16, −7, 2, 3, 11, 15, −3, 11, 22, 36},

{1, 2, 3, −11, −2, −5, 4, 8, 9, −3, −2, 26, 28},

{0, −1, 10, −9, −1, −8, 2, 3, 4, 0, 0, 29, 70},

{1, 2, 0, −5, 1, −9, 9, 3, 0, 1, −7, 20, 96},

{−2, 8, '6, −4, 3, −9, −8, 45, 14, 2, −13, 7, 54},

{1, −1, 16, −19, −8, −4, −3, 2, 19, 0, 4, 30, 54},

{1, 1, −3, 0, 2, −11, 15, −5, 1, 2, −9, 24, 92}, {0, 1, −2, 0, 1, −4, 4, 0, 0, 1, −4, 7, 120}, {0, 1, 2, −5, 1, −6, 4, 10, −2, 1, −4, 10, 104},

{3, 0, −3, −6, −2, −6, 14, 8, −1, −1, −3, 31, 60},

{0, 1, 0, −2, 1, −6, 5, 1, 0, 1, −5, 13, 110}, {3, 1, 9, −19, −21, 9, 7, 6, 13, 5, 15, 21, 30}, {2, 4, 3, −12, −13, 1, 7, 8, 3, 0, 12, 26, 46},

{3, 1, −8, −2, 0, −6, 18, 2, −2, 3, −10, 23, 84},

{1, 1, −4, −1, 1, −5, 8, 1, −1, 2, −5, 10, 112},

{0, 1, −1, 0, 0, −2, 2, 0, 0, 1, −2, 3, 124}, {1, 1, −2, −7, 1, −7, 14, 18, 0, 0, −7, 21, 62}, {0, 1, 0, −2, 0, −7, 8, 1, −2, 0, −3, 24, 88},

{0, 1, 1, −2, 2, −10, 10, 0, −2, 1, −7, 23, 94},

{0, 2, 2, −11, 2, −4, −3, 39, 7, 1, −10, 9, 60},

{1, 0, 13, −16, −5, −6, −1, 8, 6, 0, 6, 29, 58},

{1, 3, 1, −6, −4, −7, 9, 6, −3, −2, 3, 33, 60},

{4, 0, −17, −1, −1, 5, 26, 8, −2, 3, −15, 30, 48},

{0, 1, −2, 0, 2, −8, 12, −6, 1, 1, −6, 16, 106}, {0, 0, 0, −1, 1, −4, 4, 0, 0, 0 −3, 11, 112}, {0, 1, 2, −8, 2, −6, 5, 15, 0, 2, −7, 9, 98},

{1, −1, 12, −15, −7, −2, 3, 6, 6, −1, 7, 30, 50},};

{{AlfClassToFIlterMapping}}[16][25] =

{{8, 2, 2, 2, 3, 4, 53, 9, 9, 52, 4, 4, 5, 9, 2, 8, 10, 9, 1, 3, 39, 39, 10, 9, 52}, {11, 12, 13, 14, 15, 30, 11, 17, 18, 19, 16, 20, 20, 4, 53, 21, 22, 23, 14, 25, 26, 26, 27, 28, 10},

{16, 12, 31, 32, 14, 16, 30, 33, 53, 34, 35, 16, 20, 4, 7, 16, 21, 36, 18, 19, 21, 26, 37, 38, 39}, {35, 11, 13, 14, 43, 35, 16, 4, 34, 62, 35, 35, 30, 56, 7, 25, 21, 38, 24, 40, 16, 21, 48, 57, 39},

{11, 31, 32, 43, 44, 16, 4, 17, 34, 45, 30, 20, 20, 7, 5, 21, 22, 46, 40, 47, 26, 48, 63, 58, 10}, {12, 13, 50, 51, 52, 11, 17, 53, 45, 9, 30, 4, 53, 19, 0, 22, 23, 25, 43, 44, 37, 27, 28, 10, 55},

{30, 33, 62, 51, 44, 20, 41, 56, 34, 45, 20, 41, 41, 56, 5, 30, 56, 38, 40, 47, 11, 37, 42, 57, 8}, {35, 11, 23, 32, 14, 35, 20, 4, 17, 18, 21, 20, 20, 20, 4, 16, 21, 36, 46, 25, 41, 26, 48, 49, 58},

{12, 31, 59, 59, 3, 33, 33, 59, 59, 52, 4, 33, 17, 59, 55, 22, 36, 59, 59, 60, 22, 36, 59, 25, 55},

{31, 25, 15, 60, 60, 22, 17, 19, 55, 55, 20, 20, 53, 19, 55, 22, 46, 25, 43, 60, 37, 28, 10, 55, 52},

{12, 31, 32, 50, 51, 11, 33, 53, 19, 45, 16, 4, 4, 53, 5, 22, 36, 18, 25, 43, 26, 27, 27, 28, 10}, {5, 2, 44, 52, 3, 4, 53, 45, 9, 3, 4, 56, 5, 0, 2, 5, 10, 47, 52, 3, 63, 39, 10, 9, 52},

{12, 34, 44, 44, 3, 56, 56, 6, 45, 9, 56, 56, 7, 5, 0, 22, 38, 40, 47, 52, 48, 57, 39, 10, 9}, {35, 11, 23, 14, 51, 35, 20, 41, 56, 62, 16, 20, 41, 56, 7, 16, 21, 38, 24, 40, 26, 26, 42, 57, 39},

{33, 34, 51, 51, 52, 41, 41, 34, 62, 0, 41, 41, 56, 7, 5, 56, 38, 38, 40, 44, 37, 42, 57, 39, 10},

{16, 31, 32, 15, 60, 30, 4, 17, 19, 25, 22, 20, 4, 53, 19, 21, 22, 46, 25, 55, 26, 48, 63, 58, 55},};

((if alf_signal_new_filter_chroma is 1, the following process))

The chroma filter coefficients $AlfCoeff_C[j]$, with $j=0 \ldots 5$ are derived as follows:

$AlfCoeff_C[j]=alf\_chroma\_coeff\_abs[j]*(1-2*alf\_chroma\_coeff\_sign[j])$ (7-57)

The last filter coefficient for j=6 is derived as follows:

$$AlfCoeff_C[6]=128-\Sigma_k(AlfCoeff_C[k]<<1), \text{ with } k=0\ldots 5 \quad (7\text{-}58)$$

It is a requirement of bitstream conformance that the values of $AlfCoeff_C[j]$ with $j=0\ldots 5$ shall be in the range of $-2^7-1$ to $2^7-1$, inclusive and that the values of $AlfCoeff_C[6]$ shall be in the range of $0$ to $2^8-1$, inclusive.

--- otherwise ( (( alf_signal_new_filter_chroma is 0 ))), the following is invoked
  for (i = Tid; i >= 0; i--)
  {
    for (k = 0; k < temp_size_C; k++)
    {
      if (temp$_{Tid\_C}$[ k ] == i)
      {
        closest temporal index is set as k;
        break;
      }
    }
}

---

The chroma filter coefficients $AlfCoeff_C[j]$, with $j=0\ldots 6$ are derived as follows:

$$AlfCoeff_C[j]=Temp_C[closest\_temporal\_index][j]$$

7.4.5.2 Coding Tree Unit Semantics ((alf_luma_ctb_filter_set_index[xCtb>>Log 2CtbSize][yCtb>>Log 2CtbSize])) specifies the filter set index of luma CTB at location (xCtb, yCtb).

((alf_use_new_filter)) is equal to 1 specifies that alf_luma_ctb_filter_set_index[xCtb>>Log 2CtbSize][yCtb>>Log 2CtbSize] is 16. alf_use_new_filter is equal to 0 specifies that alf_luma_ctb_filter_set_index[xCtb>>Log 2CtbSize][yCtb>>Log 2CtbSize] is not 16.

((alf_use_fixed_filter)) is equal to 1 specifies that one of the fixed filter sets is used. alf_use_fixed_filter is equal to 0 specifies that current luma CTB doesn't use any fixed filter set.

((alf_fixed_filter_index)) specifies the fixed filter set index, which can be from 0 to 15.

((alf_temporal_index)) specifies the temporal filter set index, which can be from 0 to alf_num_available_temporal_filter_sets_luma−1.

[[8.5.1 General]]

1. When sps_alf enabled_flag is equal to 1, the following applies:

[[The temporal filter refresh process as specified in clause 8.5.4.5 is invoked.]]

The adaptive loop filter process as specified in clause 8.5.4.1 is invoked with the reconstructed picture sample arrays $S_L$, $S_{Cb}$ and $S_{Cr}$ as inputs, and the modified reconstructed picture sample arrays $S'_L$, $S'_{Cb}$ and $S'_{Cr}$ after sample adaptive offset as outputs.

The arrays $S'_L$, $S'_{Cb}$ and $S'_{Cr}$ are assigned to the arrays $S_L$, $S_{Cb}$ and $S_{Cr}$ (which represent the decoded picture), respectively.

[[The temporal filter update process as specified in clause 8.5.4.6 is invoked.]]

((8.5.4.2 Coding Tree Block Filtering Process for Luma Samples))

The array of luma filter coefficients f[j] corresponding to the filter specified by filtIdx[x][y] is derived as follows with $j=0\ldots 12$:

---

$$f[ j ] = (( AlfCoeff_{LumaAll} ))[ alf\_luma\_ctb\_filter\_set\_index[ xCtb >> Log2CtbSize ][ yCtb >> Log2CtbSize ] ][ filtIdx[ x ][ y ] ][ j ] \quad (8\text{-}732)$$

---

[[8.5.4.5 Temporal Filter Refresh]]
If any of the below condition is true,
  Current picture is IDR picture
  Current picture is BLA picture
  In decoding order, current picture is the first picture with POC larger than the POC of the last decoded IRAP picture, i.e. after leading pictures and before trailing pictures.
then temp_size_L and temp_size_C are set as 0.
[[8.5.4.6 Temporal Filter Update]]
If slice_alf_enabled_flag is 1 and alf_signal_new_filter_luma is 1, the following applies.

---

If luma temporal filter buffer size temp_size_L < 5, temp_size_L = temp_size_L + 1.
Temp$_L$[ i ][ j ][ k ] with i = temp_size_L − 1 . . . 1, j = 0 . . . NumAlfFilters-1 and k = 0 . . . 12 is updated as,
  Temp$_L$[ i ][ j ][ k ] = Temp$_L$[ i-1 ][ j ][ k ]
Temp$_L$[ 0 ][ j ][ k ] with j = 0 . . . NumAlfFilters-1 and k = 0 . . 12 is updated as
  Temp$_L$[ 0 ][ j ][ k ] = AlfCoeff$_L$[ j ][ k ]
Temp$_{Tid\_L}$[ i ] with i = temp_size_L − 1 . . . 1 is updated as
  Temp$_{Tid\_L}$[ i ] = Temp$_{Tid\_L}$[ i-1 ]
Temp$_{Tid\_L}$[ 0 ] is set as current slice's temporal layer index Tid
if alf_chroma_idx is not 0 and alf_signal_new_filter chroma is 1, the following applies
Temp$_c$[ i ][ j ] with i = temp_size_c − 1 . . . 1 and j = 0 . . . 6 is updated as,
  Temp$_c$[ i ][ j ] = Temp$_c$[ i-1 ][ j ]
Temp$_c$[ 0 ][ j ] with j = 0 . . . 6 is updated as
  Temp$_c$[ 0 ][ j ] = AlfCoeff$_C$ [ j ]
Temp$_{Tid\_C}$[ i ] with i = temp size C − 1 . . . 1 is updated as
  Temp$_{Tid\_C}$[ i ] = Temp$_{Tid\_C}$[ i-1 ]
Temp$_{Tid\_C}$[ 0 ] is set as current slice's Tid

TABLE 9-4

Syntax elements and associated binarizations

| Syntax structure | Syntax element | Binarization Process | Input parameters |
|---|---|---|---|
| coding_tree_unit( ) | alf_ctb_flag[ ][ ][ ] | FL | cMax = 1 |
| | (( alf_use_new_filter_set | FL | cMax = 1 |
| | alf_used_fixed_filter | FL | cMax = 1 |
| | alf_fixed_filter_index | TB | cMax = 15 |
| | alf_temporal_index | TB | cMax = alf_num_available_temporal_filter_sets_luma-1)) |

TABLE 9-10

Assignment of ctxInc to syntax elements with context coded bins

| Syntax element | binIdx 0 | 1 | 2 | 3 | 4 | >= 5 |
|---|---|---|---|---|---|---|
| (( alf_use_new_filter_set | 0 | na | na | na | na | na |
| alf_used_fixed_filter | 0 | na | na | na | na | na )) |

9 In-Loop Reshaping (ILR) in JVET-M0427

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

9.1 PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2FP\_PREC-1)>>FP\_PREC)+c$$

Herein, m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

9.2 Test CE12-2 in the 4th VVC Meeting

9.2.1 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 7:
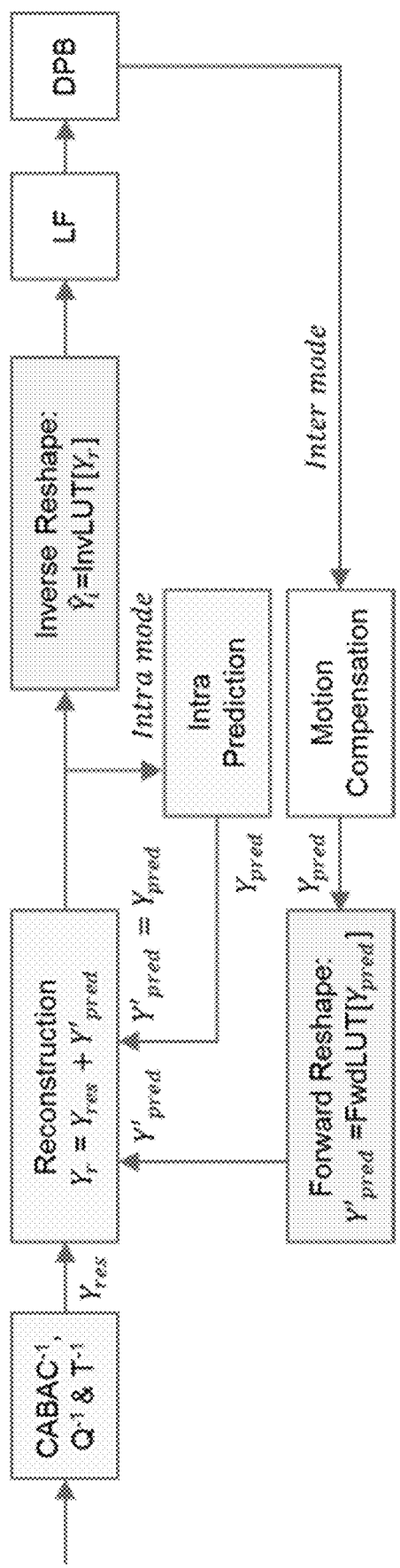
FIG. 7 shows an exemplary flowchart of decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 7 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (lighter shaded blocks indicate signal in reshaped domain: luma residue; intra luma predicted; and intra luma reconstructed)

9.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the average value of the corresponding luma prediction block is utilized.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

9.2.3 Signaling of ILR Side Information

The parameters are (currently) sent in the tile group header (similar to ALF). These reportedly take 40-100 bits. The following spec is based on version 9 of JVET-L1001. The added syntax is highlighted in yellow.

In 7.3.2.1 Sequence Parameter Set RBSP Syntax

| | Descriptor |
|---|---|
| seq_parameter_set_rbsp( ) { | |
|   sps_seq_parameter_set_id | ue (v) |
|   ... | |
|   sps_triangle_enabled_flag | u (1) |
|   sps_ladf_enabled_flag | u (1) |
|   if ( sps_ladf_enabled_flag ) { | |
|     sps_num_ladf_intervals_minus2 | u (2) |
|     sps_ladf_lowest_interval_qp_offset | se (v) |
|     for( i = 0; i < sps_num_ladf_intervals_minus2 + 1; i++ ) { | |
|       sps_ladf_qp_offset[ i ] | se (v) |
|       sps_ladf_delta_threshold_minus1[ i ] | ue (v) |
|     } | |
|   } | |
| {{sps_reshaper_enabled_flag | u (1) }} |
|   rbsp_trailing_bits( ) | |
| } | |

In 7.3.3.1 General Tile Group Header Syntax

| | Descriptor |
|---|---|
| tile_group_header( ) { | |
|   ... | |
|   if( num_tiles_in_tile_group_minus1 > 0 ) { | |
|     offset_len_minus1 | ue (v) |
|     for( i = 0; i < num_tiles_in_tile_group_minus1; i++ ) | |
|       entry_point_offset_minus1[ i ] | u (v) |
|   } | |
| {{if ( sps_reshaper_enabled_flag ) { | |
|     tile_group_reshaper_model_present_flag | u (1) |
|     if ( tile_group_reshaper_model_present_flag ) | |
|       tile_group_reshaper_model ( ) | |
|     tile_group_reshaper_enable_flag | u (1) |
|     if ( tile_group_reshaper_enable_flag && (!( qtbtt_dual_tree_intra_flag && tile_group_type == I ) ) ) | |
|       tile_group_reshaper_chr oma_residual_scale_flag | u (1) |
| }}} | |
|   byte_alignment( ) | |
| } | |

40

Add a New Syntax Table Tile Group Reshaper Model:

| | Descriptor |
|---|---|
| {{ tile_group_reshaper_model ( ) { | |
|   reshaper_model_min_bin_idx | ue (v) |
|   reshaper_model_delta_max_bin_idx | ue (v) |
|   reshaper_model_bin_delta_abs_cw_prec_minus1 | ue (v) |
|   for ( i = reshaper_model_min_bin_idx; i <= reshaper_model_max_bin_idx; i++ ) { | |
|     reshape_model_bin_delta_abs_CW [ i ] | u (v) |
|     if ( reshaper_model_bin_delta_abs_CW [ i ] ) > 0 ) | |
|       reshaper_model_bin_delta_sign_CW_flag[ i ] | u (1) |
|   } | |
| } }} | |

{{In General Sequence Parameter Set RBSP Semantics, Add the Following Semantics:}}
sps_reshaper_enabled_flag equal to 1 specifies that reshaper is used in the coded video sequence (CVS). sps_reshaper_enabled_flag equal to 0 specifies that reshaper is not used in the CVS.
{{In Tile Group Header Syntax, Add the Following Semantics}}
tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.
{{Add tile_group_reshaper_model( ) Syntax}}
reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.
reshaper_model_bin_delta_abs_cw_prec_minus1 plus 1 specifies the number of bits used for the representation of the syntax reshape_model_bin_delta_abs_CW[i].
reshape_model_bin_delta_abs_CW[i] specifies the absolute delta codeword value for the ith bin.
reshaper_model_bin_delta_sign_CW_flag[i] specifies the sign of reshape_model_bin_delta_abs_CW[i] as follows:
   If reshape_model_bin_delta_sign_CW_flag[i] is equal to 0, the corresponding variable RspDeltaCW[i] is a positive value.
   Otherwise (reshape_model_bin_delta_sign_CW_flag[i] is not equal to 0), the corresponding variable RspDeltaCW[i] is a negative value.
When reshape_model_bin_delta_sign_CW_flag[i] is not present, it is inferred to be equal to 0.
The variable RspDeltaCW[i]=(1−2*reshape_model_bin_delta_sign_CW
[i])*reshape_model_bin_delta_abs_CW[i];
The variable RspCW[i] is derived as following steps:
The variable OrgCW is set equal to $(1<<BitDepth_Y)/(MaxBinIdx+1)$.
   If reshaper_model_min_bin_idx<=i<=reshaper_model_max_bin_idx RspCW[$i$]=OrgCW+RspDeltaCW[$i$].

Otherwise, RspCW[i]=0.
The value of RspCW[i] shall be in the range of 32 to 2*OrgCW−1 if the value of $BitDepth_Y$ is equal to 10.
The variables InputPivot[i] with i in the range of 0 to MaxBinIdx+1, inclusive are derived as follows InputPivot[$i$]=$i$*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
   ReshapePivot[ i + 1 ] = ReshapePivot[ i ] + RspCW[ i ]
   ScaleCoef[ i ] = ( RspCW[ i ] * (1 << shiftY) + (1 << Log2(OrgCW) − 1))) >>(Log2
(OrgCW))
      if ( RspCW[ i ] == 0)
         InvScaleCoeff[ i ] = 0
      else
         InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:

ChromaResidualScaleLut[ 64 ] = {16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

shiftC = 11

- if ( RspCW[ i ] == 0 )

ChromaScaleCoef [ i ] = (1 << shiftC)

- Otherwise (RspCW[ i ] != 0), ChromaScaleCoef[ i ] = ChromaResidualScaleLut[ RspCW[ i ] >> 1 ]

9.2.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
- Current block is intra-coded
- Current block is coded as CPR (current picture referencing, aka intra block copy, IBC)
- Current block is coded as combined inter-intra mode (CIIP) and the forward reshaping is disabled for the intra prediction block

10 Bi-Directional Optical Flow (BDOF)

10.1 Overview and Analysis of BIO

In BIO, motion compensation is first performed to generate the first predictions (in each prediction direction) of the current block. The first predictions are used to derive the spatial gradient, the temporal gradient and the optical flow of each sub-block or pixel within the block, which are then used to generate the second prediction, e.g., the final prediction of the sub-block or pixel. The details are described as follows.

The bi-directional optical flow (BIO) method is a sample-wise motion refinement performed on top of block-wise motion compensation for bi-prediction. In some implementations, the sample-level motion refinement does not use signaling. Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (11)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Eq. (12)}$$

Figure 8:
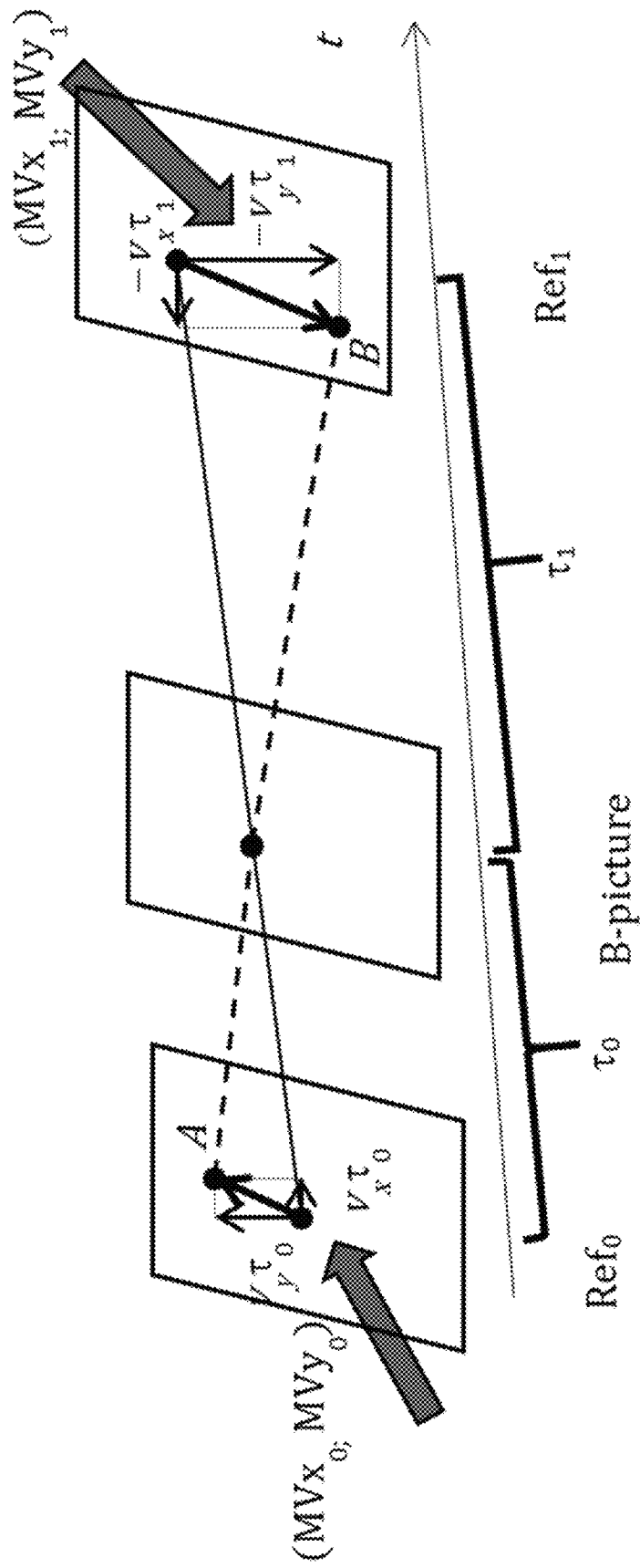
FIG. 8 shows an example of an optical flow trajectory used by the bi-directional optical flow (BIO) algorithm.

FIG. 8 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC(current)} - \text{POC}(\text{Ref}_0)$, $\tau_1 = \text{POC(current)} - \text{POC}(\text{Ref}_1)$. If both predictions come from the same time direction (either both from the past or both from the future) then the signs are different (e.g., $\tau_0 \tau_1 < 0$). In this case, BIO is applied if the prediction is not from the same time moment (e.g., $\tau_0 \ne \tau_1$).

The motion vector field $(v_x, v_y)$ is determined by minimizing the difference $\Delta$ between values in points A and B. FIG. 8 shows an example of intersection of motion trajectory and reference frame planes. Model uses only first linear term of a local Taylor expansion for $\Delta$:

$$\Delta = (I^{(0)} - I^{(1)}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad \text{Eq. (13)}$$

All values in the above equation depend on the sample location, denoted as (i', j'). Assuming the motion is consistent in the local surrounding area, $\Delta$ can be minimized inside the $(2M+1) \times (2M+1)$ square window $\Omega$ centered on the currently predicted point (i, j), where M is equal to 2:

$$(v_x, v_y) = \underset{v_x, v_y}{\text{argmin}} \sum_{[i',j'] \in \Omega} \Delta^2[i', j'] \quad \text{Eq. (14)}$$

For this optimization problem, the JEM uses a simplified approach making first a minimization in the vertical direction and then in the horizontal direction. This results in the following:

$$v_x = (s_1 + r) > m ? \; \text{clip3}\left(-thBIO, thBIO, -\frac{s_3}{(s_1 + r)}\right); 0 \quad \text{Eq. (15)}$$

$$v_y = (s_5 + r) > m ? \; \text{clip3}\left(-thBIO, thBIO, -\frac{s_6 - v_x s_2/2}{(s_5 + r)}\right); 0 \quad \text{Eq. (16)}$$

where, $$s_1 = \sum_{[i',j'] \in \Omega} (\tau_1 \partial I^{(1)}/\partial x + \tau_0 \partial I^{(0)}/\partial x)^2; \quad \text{Eq. (17)}$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (15) and Eq. (16), where:

$$r = 500 \cdot 4^{d-8} \quad \text{Eq. (18)}$$

$$m = 700 \cdot 4^{d-8} \quad \text{Eq. (19)}$$

Here, d is bit depth of the video samples.

Figure 9B:
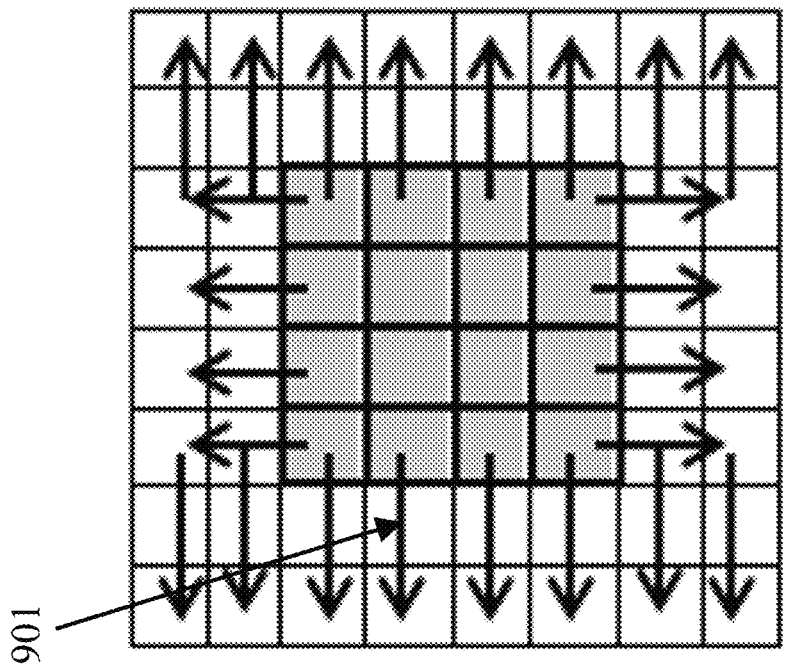
FIGS. 9A and 9B show example snapshots of using of the bi-directional optical flow (BIO) algorithm without block extensions.
Figure 9A:
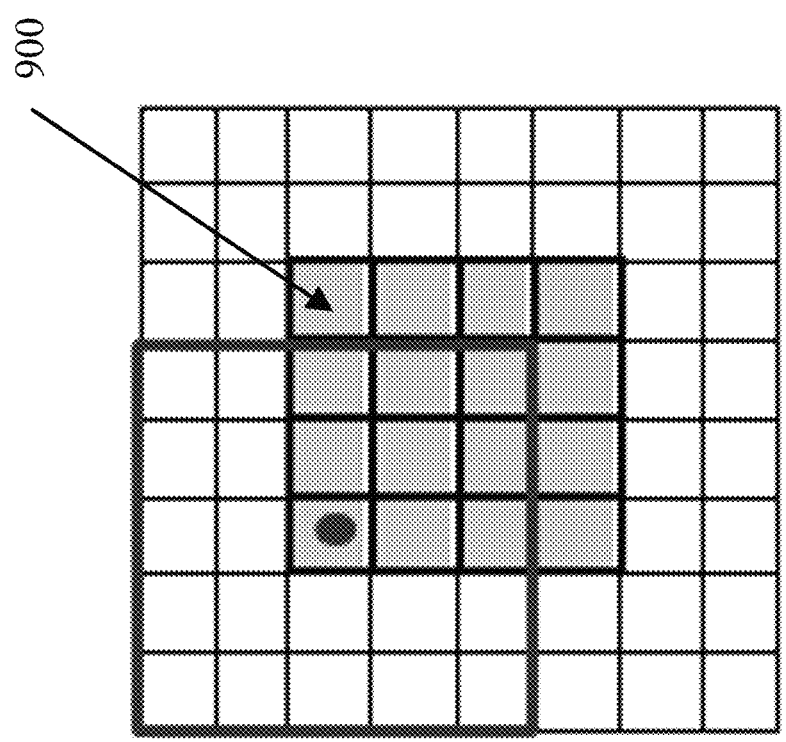

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 9A shows an example of access positions outside of a block 900. As shown in FIG. 9A, in Eq. (17), $(2M+1) \times (2M+1)$ square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 901, as shown in FIG. 9B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (17) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y)\in b_k} \sum_{[i',j]\in\Omega(x,y)} (\tau_1 \partial I^{(1)}/\partial x + \tau_0 \partial I^{(0)}/\partial x)^2; \quad \text{Eq. (20)}$$

$$s_{3,b_k} = \sum_{(x,y)\in b_k} \sum_{[i',j]\in\Omega(x,y)} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in\Omega(x,y)} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$s_{5,b_k} = \sum_{(x,y)\in b_k} \sum_{[i',j]\in\Omega(x,y)} (\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega(x,y)} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (15) and Eq (16) are replaced by $((s_{n,bk})>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient $\partial I/\partial y$, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 2 shows example filters that can be used for gradients calculation of different fractional positions of block motion vector in BIO. Table 3 shows example interpolation filters that can be used for prediction signal generation in BIO.

TABLE 2

Exemplary filters for gradient calculations in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |

TABLE 2-continued

Exemplary filters for gradient calculations in BIO

| Fractional pel position | Interpolation filter for gradient(BIOfilterG) |
|---|---|
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 3

Exemplary interpolation filters for prediction signal generation in BIO

| Fractional pel position | Interpolation filter for prediction signal(BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

11 Prediction Refinement with Optical Flow (PROF) in JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF is described as following four steps.

Step 1) The sub-block-based affine motion compensation is performed to generate sub-block prediction I(i, j).

Step 2) The spatial gradients $g_x(i, j)$ and $g_y(i, j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement is calculated by the optical flow equation.

$$\Delta I(i,j) = g_x(i,j) * \Delta v_x(i,j) + g_y(i,j) * \Delta v_y(i,j)$$

Figure 10:
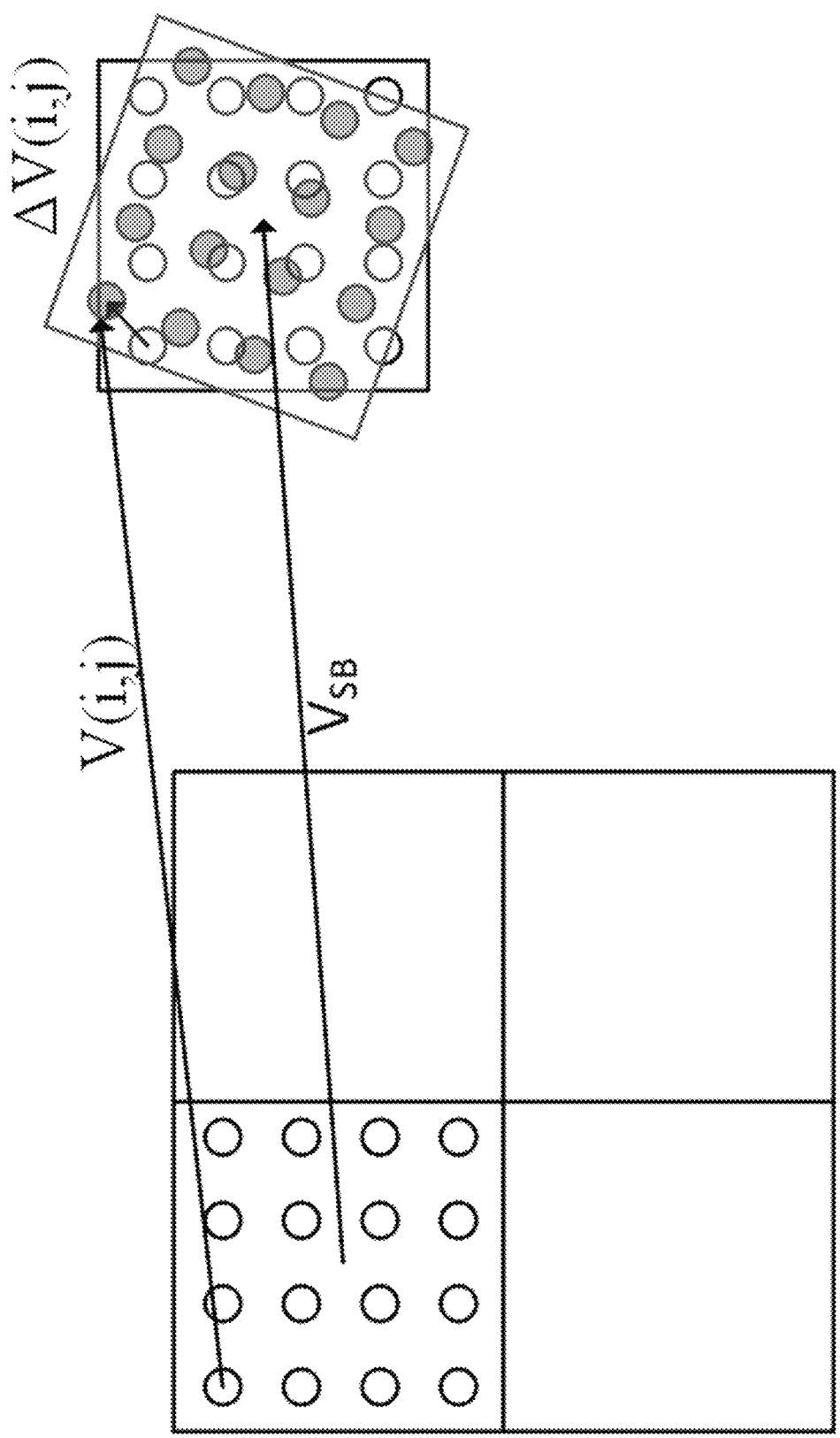
FIG. 10 shows an example of prediction refinement with optical flow (PROF).

Herein, $\Delta v(i, j)$ is the difference between pixel MV computed for sample location $(i, j)$, denoted by $v(i, j)$, and the sub-block MV of the sub-block to which pixel $(i, j)$ belongs, as shown in FIG. 10.

Since the affine model parameters and the pixel location relative to the sub-block center are not changed from sub-block to sub-block, $\Delta v(i, j)$ can be calculated for the first sub-block, and reused for other sub-blocks in the same CU. Let x and y be the horizontal and vertical offset from the pixel location to the center of the sub-block, $\Delta v(x, y)$ can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \frac{v_{1x} - v_{0x}}{w} \\ e = -d = \frac{v_{1y} - v_{0y}}{w} \end{cases}$$

For 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}$$

Herein, $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction $I(i, j)$. The final prediction $I'$ is generated as the following equation:

$$I'(i,j) = I(i,j) + \Delta I(i,j)$$

12 Drawbacks of Existing Implementations

The non-linear ALF (NLALF) in JVET-N0242 design has the following problems:

(1) Many clipping operations is required in NLALF.
(2) In CTU based ALF, when alf_num_available_temporal_filter_sets_luma is equal to 0, there is no available temporal luma filters. However, alf_temporal_index may be still signaled.
(3) In CTU based ALF, when alf_signal_new_filter_chroma is equal to 0, no new filters are signaled for chroma component, and temporal chroma filters are assumed to be used. However, temporal chroma filters are not guaranteed to be available.
(4) In CTU based ALF, alf_num_available_temporal_filter_sets_luma may be larger than available temporal filter sets.

13 Exemplary Methods for Adaptive Loop Filtering for Video Coding

Embodiments of the presently disclosed technology overcome the drawbacks of existing implementations, thereby providing video coding with higher coding efficiencies. The techniques for adaptive loop filtering, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

1. Instead of clipping the sample differences, it is proposed to apply clipping operations to intermediate results during the filtering process. Suppose the neighboring samples (adjacent or non-adjacent) of current sample utilized in the filtering process may be classified into N (N>=1) groups.
   a. In one example, one or multiple intermediate results are calculated for a group, and clipping may be performed on the one or multiple intermediate results.
      i. For example, for a group, difference between each neighboring pixel and the current pixel may be first calculated, and then these differences may be weighted averaged (denoted as wAvgDiff) using the corresponding ALF coefficients. Clipping may be performed on wAvgDiff once for the group.
   b. Different clipping parameters may be used for different groups.
   c. In one example, clipping is applied to the final weighted sum of filter coefficients multiplied by sample differences.
      i. For example, N=1, and the clipping may be performed as follows, wherein K(d, b)=min(b, max (−b, d)) is the clipping function and k is the clipping parameter.

$$O(x,y) = I(x,y) + K(\Sigma_{(i,j) \neq (0,0)} w(i,j) \cdot (I(x+i, y+j) - I(x,y)), k)$$

1) Alternatively, furthermore, the weighted sum $\Sigma_{(i,j) \neq (0,0)} w(i, j) \cdot (I(x+i, y+j) - I(x, y))$ may be further rounded to integer values, such as via shifting with or without rounding.
2. When filtering one sample, if N (N>1) neighboring samples share one filter coefficient, clipping (e.g., required by non-linear ALF) may be done once for all N neighboring pixels.
   a. For example, if I(x+i1, y+j1) and I(x+i2, y+j2) share one filter coefficient w(i1, j1) (or/and one clipping parameter k(i1, j1)), clipping may be done once as: clipValue(i1, j1)=K(I(x+i1, y+j1)+I(x+i2, y+j2)−2*I (x, y), k(i1, j1)), and w(i1, j1)*clipValue(i1, j1) may be used to replace w(i1, j1)*K(I(x+i1, y+j1)−I(x, y), k(i1, j1))+w(i2, j2)*K(I(x+i2, y+j2)−I(x, y), k(i2, j2)) in equation (14).

i. In one example, i1 and i2 may be at symmetrical positions. Also, j1 and j2 may be at symmetrical positions.
   1. In one example, i1 is equal to (−i2), and j1 is equal to (−j2).
ii. In one example, the distance between (x+i1, y+j1) and (x, y) and the distance between (x+i2, j+j2) and (x, y) may be the same.
iii. The disclosed methods in bullet 2 are enabled when the filter shape is in symmetric mode.
iv. Alternatively, furthermore, a clipping parameter associated with I(x+i1, y+j1) may be signaled/derived from bitstream, denoted by ClipParam, and k(i1, j1) mentioned above is derived from the signaled clipping parameter, such as 2*ClipParam.

b. For example, if $(i, j) \in C$ share one filter coefficient w1 (or/and one clipping parameter k1), and $C$ contains N elements, clipping may be done once as:

$$clipValue = K\left(\left(\sum_{(i,j) \in C} I(x+i, y+j)\right) - N * I(x, y), k1\right)$$

wherein k1 is the clipping parameter associated with $C$, and clipValue*w1 may be used to replace following items in equation (14):

$$\sum_{(i,j) \in C} w(i, j) * K(I(x+i, y+j) - I(x, y), k(i, j))$$

i. Alternatively, furthermore, a clipping parameter associated with I(x+i, y+j) may be signaled/derived from bitstream, denoted by ClipParam, and k1 is derived from the signaled clipping parameter, such as N*ClipParam.
ii. Alternatively, $\Sigma_{(i,j) \in C} I(x+i, y+j)$ or $(\Sigma_{(i,j) \in C} I(x+i, y+j)) - N*I(x, y)$ is right-shifted before being clipped.

c. In one example, clipping may be done once for M1 (M1<=N) of the N neighboring samples.
d. In one example, N neighboring samples may be classified into M2 groups, and clipping may be done once for each group.
e. In one example, this method may be applied to certain or all color components.
   i. For example, it may be applied to luma component.
   ii. For example, it may be applied to Cb or/and Cr component.

3. Clipping function K(min, max, input) which clips input to the range [min, max] including min and max may be used in this disclosure.
   a. In one example, clipping function K(min, max, input) which clips input to the range (min, max) excluding min and max may be used in above bullets.
   b. In one example, clipping function K(min, max, input) which clips input to be in the range (min, max] including max but excluding min may be used in above bullets.
   c. In one example, clipping function K(min, max, input) which clips input to be in the range [min, max) including min but excluding max may be used in above bullets.

4. When temporal ALF coefficient sets are unavailable (e.g., no ALF coefficients have been encoded/decoded before, or the encoded/decoded ALF coefficients are marked as "unavailable"), signaling of indications of which temporal ALF coefficient set is used may be skipped.
   a. In one example, when temporal ALF coefficient sets are unavailable, if neither new ALF coefficients nor fixed ALF coefficients are used for the CTB/block/tile group/tile/slice/picture, ALF is inferred to be disallowed for the CTB/block/tile group/tile/slice/picture.
      i. Alternatively, furthermore, in this case, even it may be indicated (e.g., alf_ctb_flag is true for the CTU/block) that ALF is applied for the CTB/block/tile group/tile/slice/picture, ALF may be finally inferred to be disallowed for the CTB/block/tile group/tile/slice/picture.
   b. In one example, when temporal ALF coefficient sets are unavailable, only new ALF coefficients or fixed ALF coefficients etc. may be indicated to be used for the CTB/block/tile group/tile/slice/picture in a conformance bitstream.
      i. For example, either alf_use_new_filter or alf_use_fixed_filter shall be true.
   c. In one example, a bitstream is considered as a non-conformance bitstream if the following condition is fulfilled: when temporal ALF coefficient sets are unavailable, for a CTB/block/tile group/tile/slice/picture wherein ALF is indicated to be employed, neither new ALF coefficients nor fixed ALF coefficients are indicated to be used for it.
      i. For example, bitstream with both alf_use_new_filter and alf_use_fixed_filter are false is considered as a non-conformance bitstream.
   d. In one example, when alf_num_available_temporal_filter_sets_luma is equal to 0, alf_temporal_index may be not signaled.
   e. Proposed method may be applied differently for different color components.

5. How many temporal ALF coefficient sets can be used for a tile group/tile/slice/picture/CTB/block/video unit may depend on the available temporal ALF coefficient sets (denote as $ALF_{avai}$), e.g., previously encoded/decoded ALF coefficient sets that are marked as "available".
   a. In one example, no more than $ALF_{avai}$ temporal ALF coefficient sets can be used for a tile group/tile/slice/picture/CTB/block.
   b. No more than min(N, $ALF_{avai}$) temporal ALF coefficient sets can be used for a tile group/tile/slice/picture/CTB/block, wherein N>=0. For example, N=5.

6. New ALF coefficient sets may be marked as "available" after they are encoded/decoded. Meanwhile, all "available" ALF coefficient sets may be all marked as "unavailable" when an IRAP (intra random access point) access unit or/and an IRAP picture or/and an IDR (instantaneous decoding refresh) access unit or/and an IDR picture is encountered.
   a. "available" ALF coefficient sets may be used as temporal ALF coefficient sets for following coded pictures/tiles/tile groups/slices/CTBs/blocks.
   b. "available" ALF coefficient sets may be maintained in one ALF coefficient set list of maximum size equal to N (N>0).

i. The ALF coefficient set list may be maintained in a first in first out order.
c. When it is marked as "unavailable", the associated ALF APS information is removed from the bitstream or replaced by other ALF APS information.
7. One ALF coefficient set list may be maintained for each temporal layer.
8. One ALF coefficient set list may be maintained for K neighboring temporal layers.
9. Different ALF coefficient set lists may be maintained for different pictures depending on whether the picture is predicted from preceding pictures (in display order) only or not.
   a. For example, one ALF coefficient set list may be maintained for pictures predicted from preceding pictures only.
   b. For example, one ALF coefficient set list may be maintained for pictures predicted from both preceding pictures and following pictures.
10. ALF coefficient set lists may be emptied after encountering an IRAP access unit or/and an IRAP picture or/and an IDR access unit or/and an IDR picture.
11. Different ALF coefficient set lists may be maintained for different color components.
   a. In one example, one ALF coefficient set list is maintained for luma component.
   b. In one example, one ALF coefficient set list is maintained for Cb or/and Cr component.
12. One ALF coefficient set list may be maintained, however, entries in the list may be assigned with different indices (or priorities) for different picture/tile group/tile/slice/CTU.
   a. In one example, ALF coefficient set may be assigned with ascending indices for ascending absolute temporal layer difference between it and the current picture/tile group/tile/slice/CTU.
   b. In one example, ALF coefficient set may be assigned with ascending indices for ascending absolute POC (picture order count) difference between it and the current picture/tile group/tile/slice/CTU.
   c. In one example, suppose there are K ALF coefficient sets are allowed by current picture/tile group/tile/slice/CTU, they may be the K ALF coefficient sets with the smallest indices.
   d. In one example, indication of which temporal ALF coefficient set is used by current picture/tile group/tile/slice/CTU may also depend on the assigned indices instead of the original entry indices in the list.
13. Neighboring samples used in ALF may be classified into K (K>=1) groups and one set of clipping parameters may be signaled for each group.
14. Clipping parameters may be predefined for certain or all fixed ALF filter sets.
   a. Alternatively, clipping parameters may be signaled for certain or all fixed filter sets that are used by current tile group/slice/picture/tile.
      i. In one example, clipping parameters may be signaled only for certain color components (e.g., luma component).
   b. Alternatively, when a fixed ALF filter set is used, no clipping may be performed.
      i. In one example, clipping may be performed for certain color components and not performed for other color components.
15. Clipping parameters may be stored together with the ALF coefficients, and may be inherited by following coded CTU/CU/tile/tile group/slice/picture.
   a. In one example, when a temporal ALF coefficient set is used by a CTU/CU/tile/tile group/slice/picture, the corresponding ALF clipping parameters may be also used.
      i. In one example, clipping parameters may be inherited only for certain color components (e.g., luma component).
   b. Alternatively, when a temporal ALF coefficient set is used by a CTU/CU/tile/tile group/slice/picture, clipping parameters may be signaled.
      i. In one example, clipping parameters may be signaled only for certain color components (e.g., luma component).
   c. In one example, clipping parameters may be inherited for certain color components, and may be signaled for other color components.
   d. In one example, when a temporal ALF coefficient set is used, no clipping is performed.
      i. In one example, clipping may be performed for certain color components and not performed for other color components.
16. Whether the non-Linear ALF is used or not may depend on the ALF filter set type (e.g., fixed ALF filter set, temporal ALF filter set or signaled ALF coefficient set).
   a. In one example, if the current CTU use fixed ALF filter set or temporal ALF filter set (a.k.a, a previously signaled filter set is used), the non-Linear ALF may be not used for the current CTU.
   b. In one example, when the alf_luma_use_fixed_filter_flag equal to 1, the non-Linear ALF may be used for the current slice/tile group/tile/CTU.
17. The non-Linear ALF clipping parameters may be conditionally signaled depending on the ALF filter set type (e.g., fixed ALF filter set, temporal ALF filter set or signaled ALF coefficient set).
   a. In one example, the non-Linear ALF clipping parameters may be signaled for all ALF filter sets.
   b. In one example, the non-Linear ALF clipping parameters may be signaled only for the signaled ALF filter coefficient sets.
   c. In one example, the non-Linear ALF clipping parameters may be signaled only for fixed ALF filter coefficient sets.

The examples described above may be incorporated in the context of the method described below, e.g., methods 1110, 1120, 1130, 1140, 1150 and 1160, which may be implemented at a video decoder and/or a video encoder.

Figure 11A:
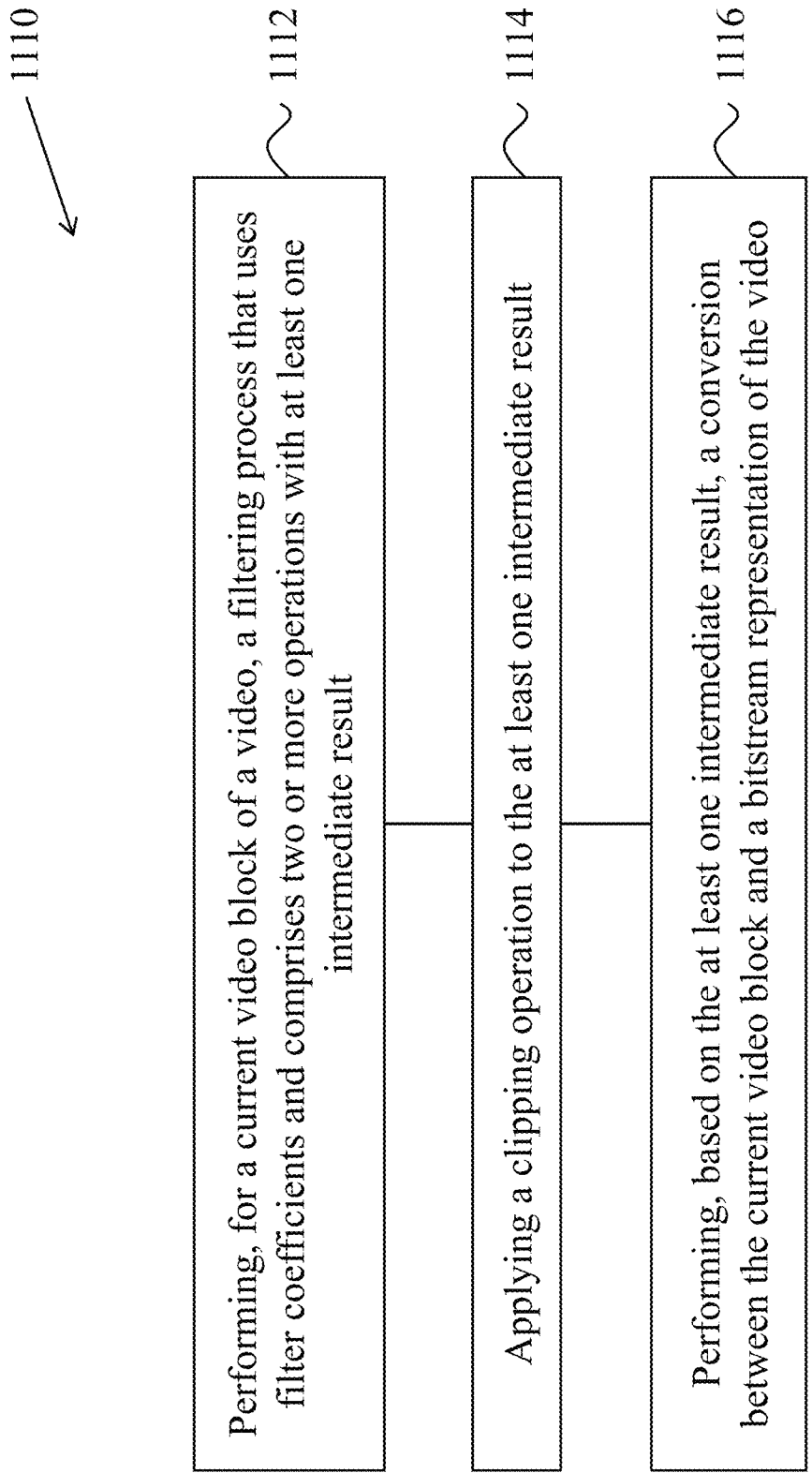

FIG. 11A shows a flowchart of an exemplary method for video processing. The method 1110 includes, at operation 1112, performing, for a current video block of a video, a filtering process that uses filter coefficients and comprises two or more operations with at least one intermediate result.

The method 1110 includes, at operation 1114, applying a clipping operation to the at least one intermediate result.

The method 1110 includes, at operation 1116, performing, based on the at least one intermediate result, a conversion between the current video block and a bitstream representation of the video. In some embodiments, the at least one intermediate result is based on a weighted sum of the filter coefficients and differences between a current sample of the current video block and neighboring samples of the current sample.

Figure 11B:
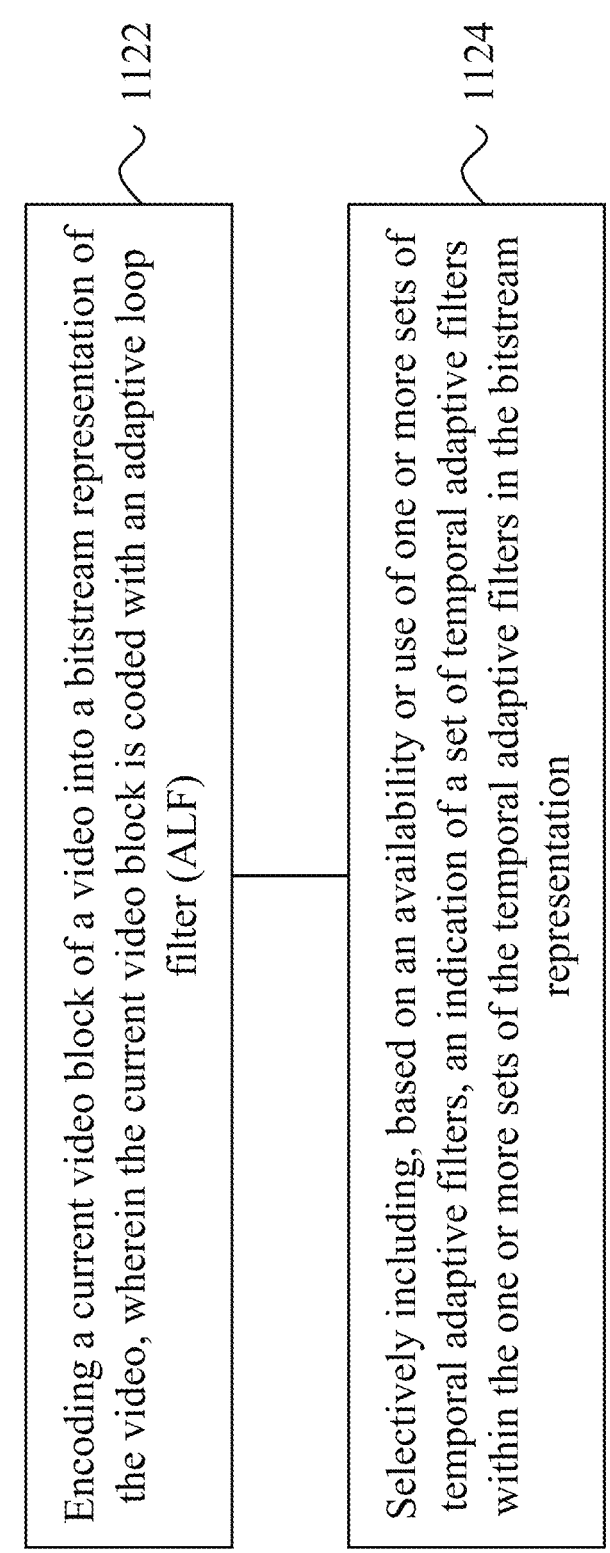

FIG. 11B shows a flowchart of an exemplary method for video processing. The method 1120 includes, at operation 1122, encoding a current video block of a video into a bitstream representation of the video, wherein the current video block is coded with an adaptive loop filter (ALF).

The method 1120 includes, at operation 1124, selectively including, based on an availability or use of one or more sets of temporal adaptive filters, an indication of a set of temporal adaptive filters within the one or more sets of the temporal adaptive filters in the bitstream representation.

Figure 11C:
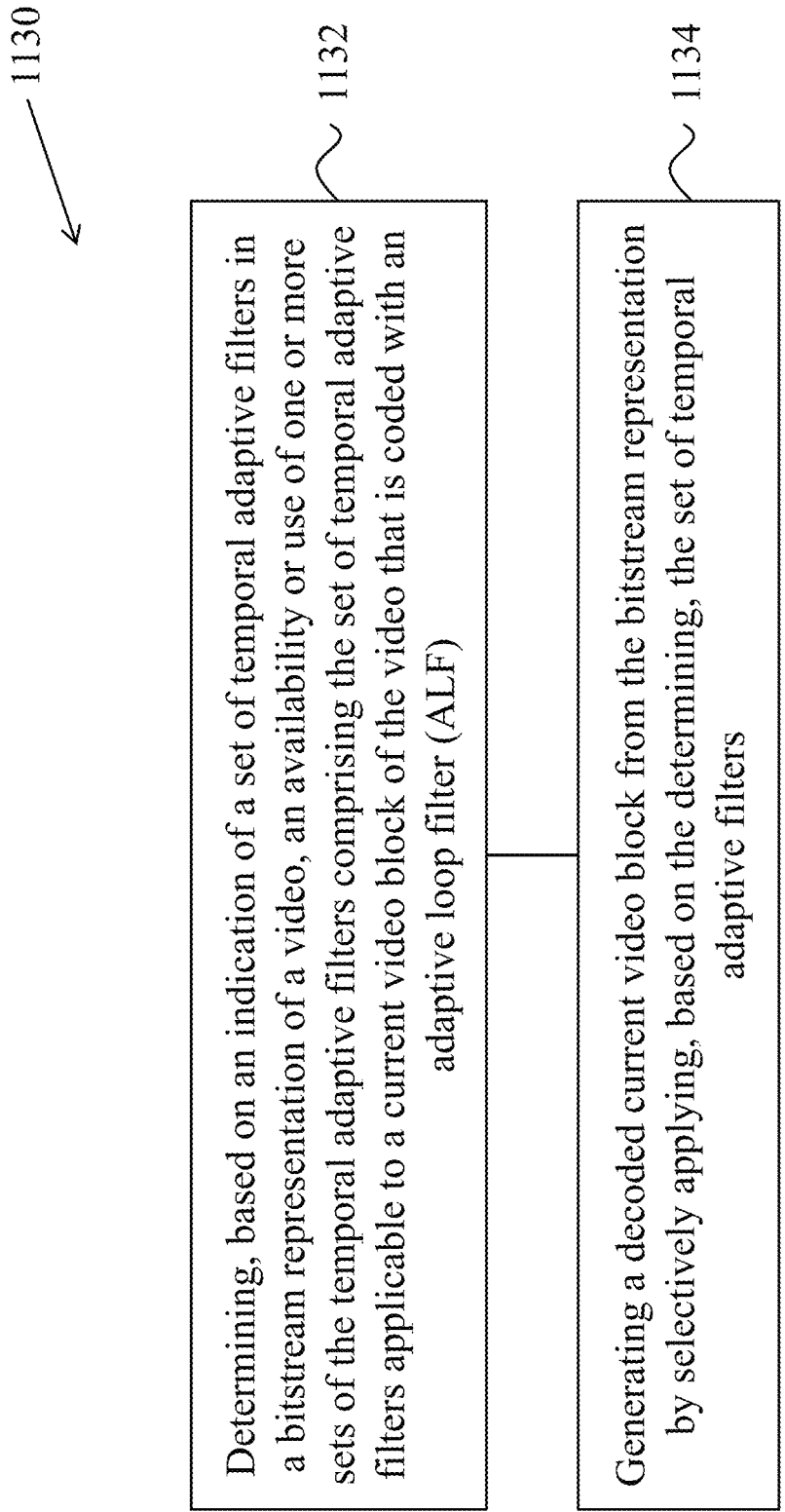

FIG. 11C shows a flowchart of an exemplary method for video processing. The method 1130 includes, at operation 1132, determining, based on an indication of a set of temporal adaptive filters in a bitstream representation of a video, an availability or use of one or more sets of the temporal adaptive filters comprising the set of temporal adaptive filters applicable to a current video block of the video that is coded with an adaptive loop filter (ALF).

The method 1130 includes, at operation 1134, generating a decoded current video block from the bitstream representation by selectively applying, based on the determining, the set of temporal adaptive filters.

FIG. 11D shows a flowchart of an exemplary method for video processing. The method 1140 includes, at operation 1142, determining, for a current video block that is coded with an adaptive loop filter, a number of temporal adaptive loop filtering (ALF) coefficient sets based on available temporal ALF coefficient sets, wherein the available temporal ALF coefficient sets have been encoded or decoded prior to the determining, and wherein the number of ALF coefficient sets is used for a tile group, a tile, a slice, a picture, a coding tree block (CTB), or a video unit comprising the current video block.

The method 1140 includes, at operation 1144, performing, based on the number of temporal ALF coefficient sets, a conversion between the current video block and a bitstream representation of the current video block.

Figure 11E:
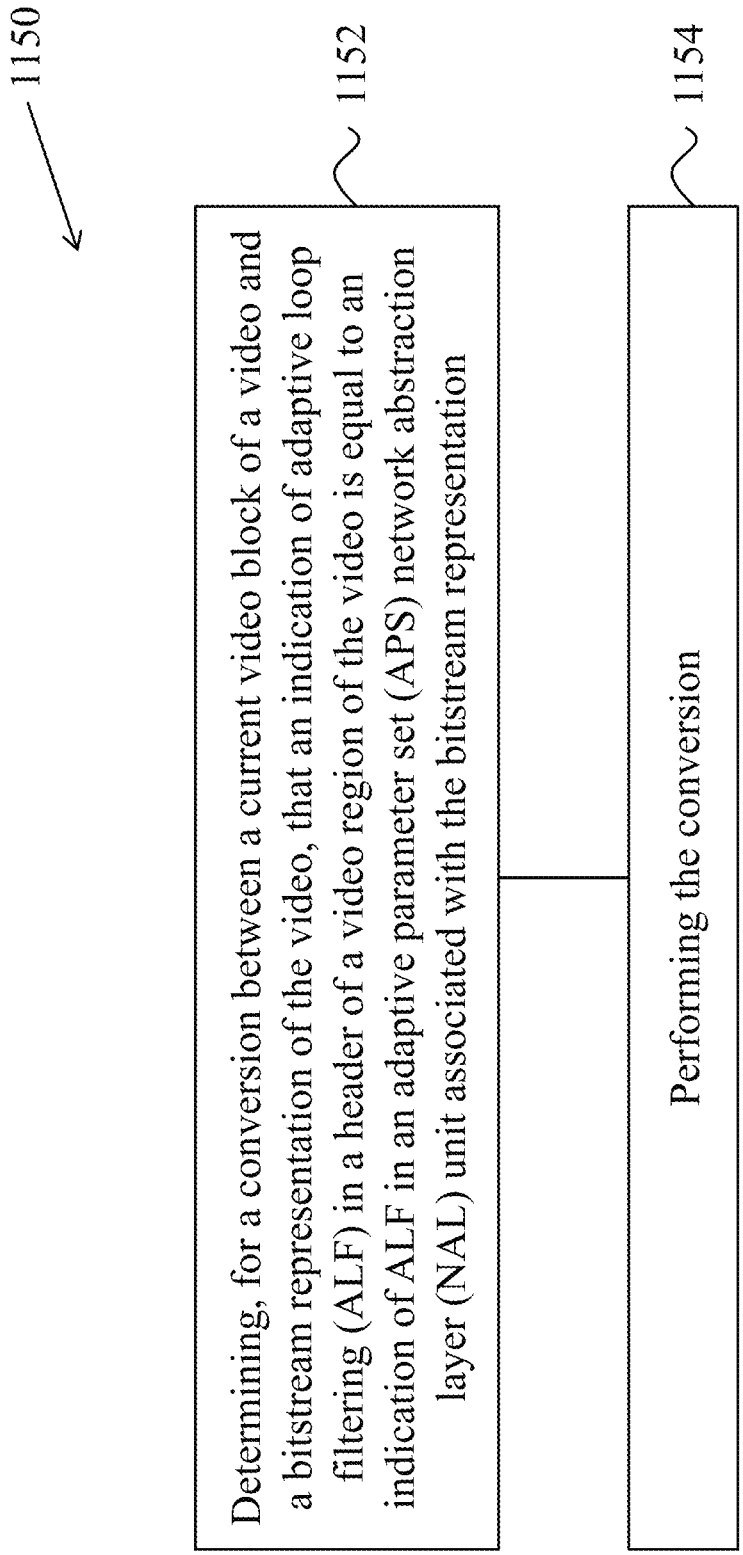

FIG. 11E shows a flowchart of an exemplary method for video processing. The method 1150 includes, at operation 1152, determining, for a conversion between a current video block of a video and a bitstream representation of the video, that an indication of adaptive loop filtering (ALF) in a header of a video region of the video is equal to an indication of ALF in an adaptive parameter set (APS) network abstraction layer (NAL) unit associated with the bitstream representation.

The method 1150 includes, at operation 1154, performing the conversion.

Figure 11F:
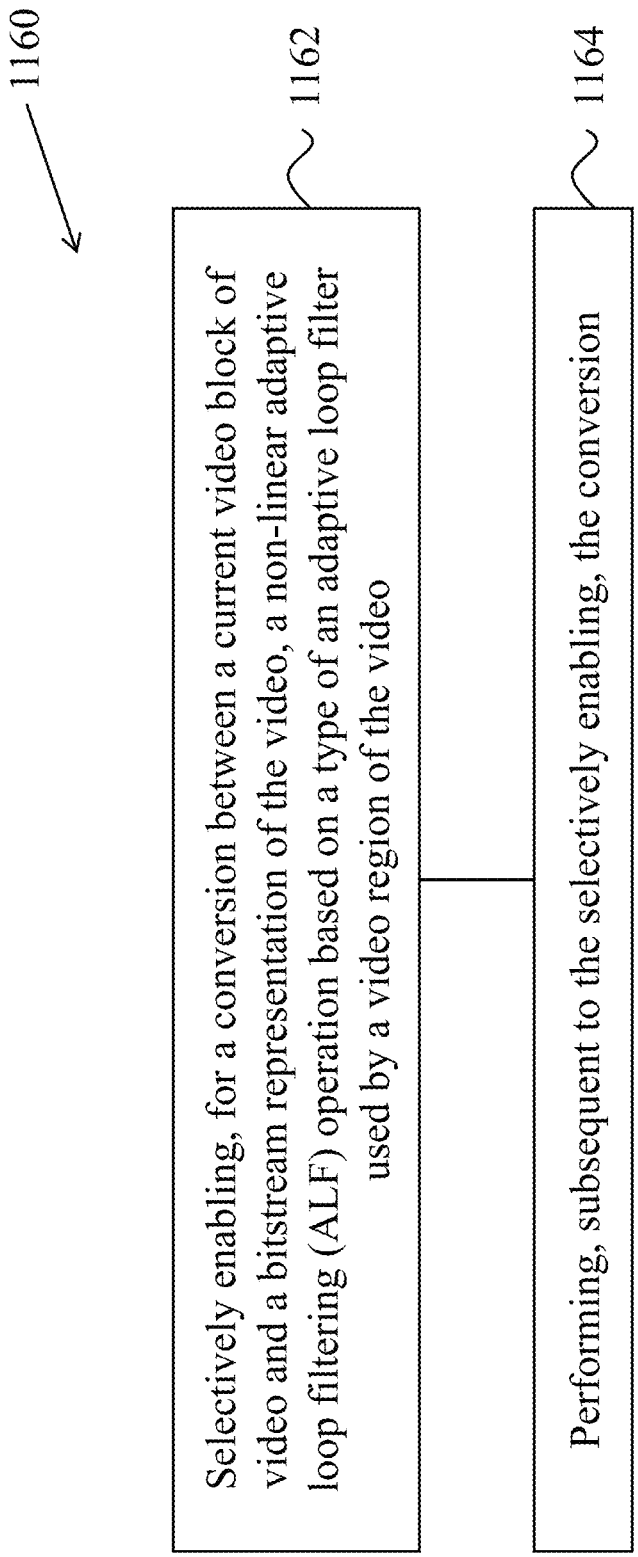

FIG. 11F shows a flowchart of an exemplary method for video processing. The method 1160 includes, at operation 1162, selectively enabling, for a conversion between a current video block of video and a bitstream representation of the video, a non-linear adaptive loop filtering (ALF) operation based on a type of an adaptive loop filter used by a video region of the video.

The method 1160 includes, at operation 1164, performing, subsequent to the selectively enabling, the conversion.

10 Example Implementations of the Disclosed Technology 10.1 Embodiment #1

Suppose one ALF coefficient set list is maintained for luma and chroma respectively, and the size of the two lists are lumaALFSetSize and chromaALFSetSize respectively. The maximum size of the ALF coefficient set list are lumaALFSetMax (e.g., lumaALFSetMax is equal to 5) and chromaALFSetMax (e.g., chromaALFSetMax is equal to 5) respectively.

Newly added parts are enclosed in double bolded curly braces, i.e., {{a}} denoted "a" is being added, and the deleted parts are enclosed in double square brackets, i.e. [[a]] denotes "a" is being deleted.

7.3.3.2 Adaptive Loop Filter Data Syntax

| | Descriptor |
|---|---|
| alf_data( ) { | |
|   alf_chroma_idc | tu (v) |
|   alf_signal_new_filter_luma | u (1) |
|   if( alf_signal_new_filter_luma > 0 ) { | |
|     alf_luma_use_fixed_filter_flag | u (1) |
|     if(alf_luma_use_fixed_filter_flag) { | |
|       alf_luma_fixed_filter_set_index | tb (v) |
|       alf_luma_fixed_filter_usage_pattern | u (1) |
|       if (alf_luma_fixed_filter_usage_pattern > 0) | |
|         for (i = 0; i < NumAlfFilters; i++) | |
|           alf_luma_fixed_filter_usage[i] | u (1) |
|   alf_num_available_temporal_filter_sets_luma | tb (1) |
|   alf_luma_num_filters_signalled_minus1 | tb (v) |
|   alf_luma_type_flag | u (1) |
|   if( alf_luma_num_filters_signalled_minus1 > 0 ) { | |
|     for( filtIdx = 0; filtIdx < NumAlfFilters; filtIdx++) | |
|       alf_luma_coeff_delta_idx[ filtIdx ] | tu (v) |
|   } | |
|   alf_luma_coeff_delta_flag | u (1) |
|   if ( !alf_luma_coeff_delta_flag && alf_luma_num_filters_signalled_minus1 > 0 ) | |
|     alf_luma_coeff_delta_prediction_flag | u (1) |
|     alf_luma_min_eg_order_minus1 | tu (v) |
|   for( i = 0; i < ( alf_luma_type_flag = = 1 ) ? 2 : 3; i++ ) | |
|     alf_luma_eg_order_increase_flag[ i ] | u (1) |
|   if ( alf_luma_coeff delta_flag ) { | |
|     for( sigFiltIdx = 0; sigFiltIdx <= alf_luma_num_filters_signalled_minus1; sigFiltIdx++) | |
|       alf_luma_coeff_flag[ sigFiltIdx ] | u (1) |
|   } | |
|   for( sigFiltIdx = 0; sigFiltIdx <= alf_luma_num_filters_signalled_minus1; sigFiltIdx++) { | |
|     if ( alf_luma_coeff_flag[ sigFiltIdx ] ) { | |
|       for ( j = 0;j < ( alf_luma_type_flag = = 1 ) ? 6: 12; j++ ) { | |
|         alf_luma_coeff_delta_abs[sigFiltIdx ][ j ] | uek (v) |
|         if( alf_luma_coeff_delta_abs[sigFiltIdx ][ j ]) | |

|  | Descriptor |
|---|---|
|           alf_luma_coeff_delta_sign[sigFiltIdx ][ j ] | u (1) |
|         } | |
|       } | |
|     } | |
|   } | |
| if ( alf_chroma_idc > 0) { | |
| alf_signal_new_filter_chroma | u (1) |
| if (alf_signal_new_filter_chroma) { | |
|   alf_chroma_min_eg_order_minus1 | tu (v) |
|   for( i = 0; i < 2; i++ ) | |
|     alf_chroma_eg_order_increase_flag[ i ] | u (1) |
|   for( j = 0; j < 6; j++ ) { | |
|     alf_chroma_coeff_abs[ j ] | uek (v) |
|     if( alf_chroma_coeff_abs[ j ] > 0 ) | |
|       alf_chroma_coeff_sign[ j ] | u (1) |
|     } | |
|   } | |
| } | |
| } | |

7.3.4.2 Coding Tree Unit Syntax

|  | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_alf_enable_flag ){ | |
|     alf_ctb_flag [ 0 ][ xCtb >> Log2CtbSize ][ yCtb >> Log2CtbSize ] | ae (v) |
|     if (alf_ctb_flag[ 0 ][ xCtb >> Log2CtbSize ][ yCtb >> Log2CtbSize ] { | |
|       coding_alf_ctu_filter_set_index(CtbAddrInRs ) | |
|     } | |
|     if( alf_chroma_idc = =1 | | alf_chroma_idc = = 3 ) | |
|       alf_ctb_flag[ 1 ][ xCtb >> Log2CtbSize ][ yCtb >> Log2CtbSize ] | ae (v) |
|     if( alf_chroma_idc = = 2 | | alf_chroma_idc = = 3 ) | |
|       alf_ctb_flag[ 2 ][ xCtb >> Log2CtbSize ][ yCtb >> Log2CtbSize ] | ae (v) |
|   } | |
|   if( slice_type = = I && qtbtt_dual_tree_intra_flag ) { | |
|     dual_tree_implicit_qt_split ( xCtb, yCtb, CtbLog2SizeY, 0 ) | |
|   else | |
|     coding_quadtree( xCtb, yCtb, CtbLog2SizeY, 0, SINGLE_TREE ) | |
| } | |

|  | Descriptor |
|---|---|
| coding_alf_ctu_filter_set_index(CtbAddrInRs, slice_type ){ | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
| alf_use_new_filter | ae (1) |
|   if (alf_use_new_filter ==0){ | |
|     alf_use_fixed_filter | ae (1) |
|   } | |
|   if (alf_use_new_filter) { | |
|     alf_luma_ctb_filter_set_index[ xCtb >> Log2CtbSize ][ yCtb >> Log2CtbSize ] = 16 | |
|   } | |
|     else if (alf_use_fixed_filter){ | |
|       alf_fixed_filter_index | tb (v) |
|   alf_luma_ctb_filter_set_index[ xCtb >> Log2CtbSize ][ yCtb >> Log2CtbSize ] = alf_fixed_filter_index | |
|   } | |
|   Else {{ if (alf_num_available_temporal_filter_sets_luma > 0) }} { | |
|     alf_temporal_index | tb (v) |
|     alf_luma_ctb_filter_set_index[ xCtb >> Log2CtbSize ][ yCtb >> Log2CtbSize ] = 16 + alf_temporal_index | |
|   } | | alf_signal_new_filter_luma equal to 1 specifies a new luma filter set is signalled. alf_signal_new_filter_luma equal to 0 specifies a new luma filter set is not signalled. It is 0 when not present.
alf_luma_use_fixed_filter_flag equal to 1 specifies that fixed filter set is used to signal adaptive loop filter. alf_luma_use_fixed_filter_flag equal to 0 specifies that fixed filter set is not used to signal adaptive loop filter.
alf_num_available_temporal_filter_sets_luma specifies the number of available temporal filter sets that can be used for current slice, it can be from 0 . . . [[5]] {{lumaALFSetSize}}. It is 0 when not present.
{{It is constrained that either alf_signal_new_filter_luma or alf_luma_use_fixed_filter_flag must be equal to 1 when alf_num_available_temporal_filter_sets_luma is equal to zero.}}
alf_signal_new_filter_chroma equal to 1 specifies a new chroma filter is signalled. alf_signal_new_filter_chroma equal to 0 specifies a new chroma filter is not signalled.
{{It is constrained that alf_signal_new_filter_chroma must be equal to 1 when chromaALFSetSize is equal to 0.}}

10.2 Embodiment #2

Suppose one ALF coefficient set list is maintained for luma and chroma respectively, and the size of the two lists are lumaALFSetSize and chromaALFSetSize respectively. The maximum size of the ALF coefficient set list are lumaALFSetMax (e.g., lumaALFSetMax is equal to 5) and chromaALFSetMax (e.g., chromaALFSetMax is equal to 5) respectively.

Newly added parts enclosed in double bolded curly braces, i.e., {{a}} denoted "a" is being added, and the deleted parts are enclosed in double square brackets, i.e. [[a]] denotes "a" is being deleted.

7.3.3.2 Adaptive Loop Filter Data Syntax

| | Descriptor |
|---|---|
| alf_data( ) { | |
|   alf_chroma_idc | tu (v) |
|   alf_signal_new_filter_luma | u (1) |
|   if( alf_signal_new_filter_luma > 0 ) { | |
|     alf_luma_use_fixed_filter_flag | u (1) |
|     if(alf_luma_use_fixed_filter_flag){ | |
|       alf_luma_fixed_filter_set_index | tb (v) |
|       alf_luma_fixed_filter_usage_pattern | u (1) |
|       if (alf_luma_fixed_filter_usage_pattern > 0) | |
|         for (i = 0; i < NumAlfFilters; i++) | |
|           alf_luma_fixed_filter_usage[i] | u (1) |
| {{ if (lumaALFSetSize > 0) }} | |
|     alf_num_available_temporal_filter_sets_luma | tb (1) |
|     alf_luma_num_filters_signalled_minus1 | tb (v) |
|     alf_luma_type_flag | u (1) |
|     if( alf_luma_num_filters_signalled_minus1 > 0) { | |
|       for( filtIdx = 0; filtIdx < NumAlfFilters; filtIdx++ ) | |
|         alf_luma_coeff_delta_idx[ filtIdx ] | tu (v) |
|     } | |
|     alf_luma_coeff_delta_flag | u (1) |
|     if ( !alf_luma_coeff_delta_flag && alf_luma_num_filters_signalled_minus1 > 0 ) | |
|       alf_luma_coeff_delta_prediction_flag | u (1) |
|     alf_luma_min_eg_order_minus1 | tu (v) |
|     for( i = 0; i <( alf_luma_type_flag = =1 ) ? 2 : 3; i++ ) | |
|       alf_luma_eg_order_increase_flag[ i ] | u (1) |
|     if ( alf_luma_coeff_delta_flag ) { | |
|       for( sigFiltIdx = 0; sigFiltIdx <= alf_luma_num_filters_signalled_minus1; sigFiltIdx++ ) | |
|         alf_luma_coeff_flag[ sigFiltIdx ] | u (1) |
|     } | |
|     for( sigFiltIdx = 0; sigFiltIdx <= alf_luma_num_filters_signalled_minus1; sigFiltIdx++) { | |
|       if ( alf_luma_coeff_flag[ sigFiltIdx ] ) { | |
|         for ( j = 0;j < ( alf_luma_type_flag = = 1 ) ? 6: 12; j++ ) { | |
|           alf_luma_coeff_delta_abs[ sigFiltIdx ][ j ] | uek (v) |
|           if( alf_luma_coeff_delta_abs[ sigFiltIdx ][ j ]) | |
|             alf_luma_coeff_delta_sign[ sigFiltIdx ][ j ] | u (1) |
|         } | |
|       } | |
|     } | |
|   } | |
|   if ( alf_chroma_idc > 0 ) { | |
|     alf_signal_new_filter_chroma | u (1) |
|     if (alf_signal_new_filter_chroma){ | |
|       alf_chroma_min_eg_order_minus1 | tu (v) |
|       for( i = 0; i < 2; i++ ) | |
|         alf_chroma_eg_order_increase_flag[ i ] | u (1) |
|       for( j = 0; j < 6; j++ ) { | |
|         alf_chroma_coeff_abs[ j ] | uek (v) |
|         if( alf_chroma_coeff_abs[ j ] > 0 ) | |
|           alf_chroma_coeff_sign[ j ] | u (1) |
|       } | |
|     } | |
|   } | |
| } | |

7.3.4.2 Coding Tree Unit Syntax

|  | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_alf_enable_flag ){ | |
|     alf_ctb_flag[ 0 ][ xCtb >> Log2CtbSize ][ yCtb >> Log2CtbSize ] | ae (v) |
|     if (alf_ctb_flag[ 0 ][ xCtb >> Log2CtbSize ][ yCtb >> Log2CtbSize ] { | |
|       coding_alf_ctu_filter_set_index(CtbAddrInRs ) | |
|     } | |
|     if( alf_chroma_idc = = 1 \| \| alf_chroma_idc = =3 ) | |
|       alf_ctb_flag[ 1 ][ xCtb >> Log2CtbSize ][ yCtb >> Log2CtbSize ] | ae (v) |
|     if( alf_chroma_idc = =2 \| \| alf_chroma_idc = =3 ) | |
|       alf_ctb_flag[ 2 ][ xCtb >> Log2CtbSize ][ yCtb >> Log2CtbSize ] | ae (v) |
|   } | |
|   if( slice_type = = I && qtbtt_dual_tree_intra_flag ) { | |
|     dual_tree_implicit_qt_split ( xCtb, yCtb, CtbLog2SizeY, 0 ) | |
|   else | |
|     coding_quadtree( xCtb, yCtb, CtbLog2SizeY, 0, SINGLE_TREE ) | |
| } | |

|  | Descriptor |
|---|---|
| coding_alf_ctu_filter_set_index(CtbAddrInRs, slice_type ){ | |
|     xCtb = ( CtbAddrInRs % PicWidthInCtbsY ) << CtbLog2SizeY | |
|     yCtb = ( CtbAddrInRs / PicWidthInCtbsY ) << CtbLog2SizeY | |
|   alf_use_new_filter | ae (1) |
|     if (alf_use_new_filter = = 0){ | |
|       alf_use_fixed_filter | ae (1) |
|   } | |
|   if (alf_use_new_filter){ | |
|     alf_luma_ctb_filter_set_index[ xCtb >> Log2CtbSize ][ yCtb >> Log2CtbSize ] = 16 | |
|   } | |
|     else if (alf_use_fixed_filter){ | |
|       alf_fixed_filter_index | tb (v) |
|     alf_luma_ctb_filter_set_index[ xCtb >> Log2CtbSize ][ yCtb >> Log2CtbSize ] = alf_fixed_filter_index | |
|   } | |
|   Else {{ if (alf_num_available_temporal_filter_sets_luma > 0) }} { | |
|     alf_temporal_index | tb (v) |
|     alf_luma_ctb_filter_set_index[ xCtb >> Log2CtbSize ][ yCtb >> Log2CtbSize ] = 16 + alf_temporal_index | |
|   } | | alf_signal_new_filter_luma equal to 1 specifies a new luma filter set is signalled. alf_signal_new_filter_luma equal to 0 specifies a new luma filter set is not signalled. It is 0 when not present.

alf_luma_use_fixed_filter_flag equal to 1 specifies that fixed filter set is used to signal adaptive loop filter. alf_luma_use_fixed_filter_flag equal to 0 specifies that fixed filter set is not used to signal adaptive loop filter.

alf_num_available_temporal_filter_sets_luma specifies the number of available temporal filter sets that can be used for current slice, it can be from 0 . . . [[5]] {{lumaALFSetSize}}. It is 0 when not present.

{{It is constrained that either alf_signal_new_filter_luma or alf_luma_use_fixed_filter_flag must be equal to 1 when alf_num_available_temporal_filter_sets_luma is equal to zero.}} alf_signal_new_filter_chroma equal to 1 specifies a new chroma filter is signalled. alf_signal_new_filter_chroma equal to 0 specifies a new chroma filter is not signalled.

{{It is constrained that alf_signal_new_filter_chroma must be equal to 1 when chromaALFSetSize is equal to 0.}}

In some embodiments, the following technical solutions can be implemented:

A1. A method for video processing, comprising performing, for a current video block of a video, a filtering process that uses filter coefficients and comprises two or more operations with at least one intermediate result; applying a clipping operation to the at least one intermediate result; and performing, based on the at least one intermediate result, a conversion between the current video block and a bitstream representation of the video, wherein the at least one intermediate result is based on a weighted sum of the filter coefficients and differences between a current sample of the current video block and neighboring samples of the current sample.

A2. The method of solution A1, further comprising classifying, for the current sample, neighboring samples of the current sample into a plurality of groups, wherein the clipping operation is applied with different parameters to intermediate results in each of the plurality of groups.

A3. The method of solution A2, wherein the at least one intermediate result comprises a weighted average of differences between the current sample and the neighboring samples in each of the plurality of groups.

A4. The method of solution A1, wherein a plurality of neighboring samples of a sample of the current video block share a filter coefficient, and wherein the clipping operation is applied once to each of the plurality of neighboring samples.

A5. The method of solution A4, wherein positions of at least two of the plurality of neighboring samples are symmetric with respect to the sample of the current video block.

A6. The method of solution A4 or A5, wherein a filter shape associated with the filtering process is in a symmetric mode.

A7. The method of any of solutions A4 to A6, wherein one or more parameters of the clipping operation is signaled in the bitstream representation.

A8. The method of solution A1, wherein a sample of the current video block comprises N neighboring samples, wherein the clipping operation is applied once to M1 neighboring samples of the N neighboring samples, wherein M1 and N are positive integers, and M1≤N.

A9. The method of solution A1, further comprising classifying, for a sample of the current video block, N neighboring samples of the sample into M2 groups, wherein the clipping operation is applied once to each of the M2 groups, and wherein M2 and N are positive integers.

A10. The method of solution A1, wherein the clipping operation is applied to a luma component associated with the current video block.

A11. The method of solution A1, wherein the clipping operation is applied to a Cb component or a Cr component associated with the current video block.

A12. The method of any of solutions A1 to A11, wherein the clipping operation is defined as K(min, max, input), wherein input is an input to the clipping operation, min is a nominal minimum value of an output of the clipping operation, and max is a nominal maximum value of the output of the clipping operation.

A13. The method of solution A12, wherein an actual maximum value of the output of the clipping operation is less than the nominal maximum value, and wherein an actual minimum value of the output of the clipping operation is greater than the nominal minimum value.

A14. The method of solution A12, wherein an actual maximum value of the output of the clipping operation is equal to the nominal maximum value, and wherein an actual minimum value of the output of the clipping operation is greater than the nominal minimum value.

A15. The method of solution A12, wherein an actual maximum value of the output of the clipping operation is less than the nominal maximum value, and wherein an actual minimum value of the output of the clipping operation is equal to the nominal minimum value.

A16. The method of solution A12, wherein an actual maximum value of the output of the clipping operation is equal to the nominal maximum value, and wherein an actual minimum value of the output of the clipping operation is equal to the nominal minimum value.

A17. The method of solution A1, wherein the filtering process comprises an adaptive loop filtering (ALF) process configured with a plurality of ALF filter coefficient sets.

A18. The method of solution A17, wherein at least one parameter for the clipping operation is predefined for one or more of the plurality of ALF filter coefficient sets.

A19. The method of solution A17, wherein at least one parameter for the clipping operation is signaled in the bitstream representation for a tile group, a slice, a picture, or a tile comprising the current video block.

A20. The method of solution A19, wherein the at least one parameter is signaled only for one or more color components associated with the current video block.

A21. The method of solution A17, wherein at least one of the plurality of ALF filter coefficient sets and one or more parameters for the clipping operation are stored in a same memory location, and wherein the at least one of the plurality of ALF filter coefficient sets or the one or more parameters are inherited by a coded coding tree unit (CTU), a coding unit (CU), a tile, a tile group, a slice, or a picture comprising the current video block.

A22. The method of solution A21, wherein the clipping operation is configured to use the one or more parameters corresponding to a temporal ALF coefficient set of the plurality of ALF filter coefficient sets upon a determination that the temporal ALF coefficient set is used in the filtering process for the CTU, the CU, the tile, the tile group, the slice, or the picture comprising the current video block.

A23. The method of solution A22, wherein the one or more parameters corresponding to the temporal ALF coefficient set is only used for one or more color components associated with the current video block.

A24. The method of solution A21, wherein the one or more parameters corresponding to a temporal ALF coefficient set of the plurality of ALF filter coefficient sets are signaled in the bitstream representation upon a determination that the temporal ALF coefficient set is used in the filtering process for the CTU, the CU, the tile, the tile group, the slice, or the picture comprising the current video block.

A25. The method of solution A24, wherein the one or more parameters corresponding to the temporal ALF coefficient set are only signaled for one or more color components associated with the current video block.

A26. The method of solution A21, wherein a first set of parameters of the one or more parameters for a first color component associated with the current video block is signaled, and wherein a second set of parameters of the one or more parameters for a second color component associated with the current video block is inherited.

A27. The method of any of solutions A1 to A26, wherein the conversion generates the current video block from the bitstream representation.

A28. The method of any of solutions A1 to A26, wherein the conversion generates the bitstream representation from the current video block.

A29. An apparatus in a video system comprising a processor and a non-transitory memory with instructions thereon, wherein the instructions upon execution by the processor, cause the processor to implement the method in any one of solutions A1 to A28.

A30. A computer program product stored on a non-transitory computer readable media, the computer program product including program code for carrying out the method in any one of solutions A1 to A28.

In some embodiments, the following technical solutions can be implemented:

B1. A method for video processing, comprising: encoding a current video block of a video into a bitstream representation of the video, wherein the current video block is coded with an adaptive loop filter (ALF); and selectively including, based on an availability or use of one or more sets of temporal adaptive filters, an indication of a set of temporal adaptive filters within the one or more sets of the temporal adaptive filters in the bitstream representation.

B2. The method of solution B1, wherein, in a case that the set of the temporal adaptive filters is unavailable, then the indication of the set is excluded from the bitstream representation.

B3. The method of solution B1 or B2, wherein, in a case that the set of the temporal adaptive filters is not unavailable, then the indication of the set is included in the bitstream representation. 4. The method of any of solutions B1 to 3, wherein, in a case that none of the one or more sets of temporal adaptive filters is available, the indication is excluded from the bitstream representation.

B4. The method of any of solutions B1 to B3, wherein each of the one or more sets of temporal adaptive filters is associated with a filter index.

B5. The method of any of solutions B1 to B3, wherein, in a case that none of the one or more sets of temporal adaptive filters is available, indications of using fixed filters shall be equal to true.

B6. The method of any of solutions B1 to B3, wherein, in a case that none of the one or more sets of temporal adaptive filters is available, indications of using temporal adaptive filters shall be equal to false.

B7. The method of any of solutions B1 to B3, wherein, in a case that none of the one or more sets of temporal adaptive filters is available, an indication of an index of a fixed filter is included in the bitstream representation.

B8. A method for video processing, comprising: determining, based on an indication of a set of temporal adaptive filters in a bitstream representation of a video, an availability or use of one or more sets of the temporal adaptive filters comprising the set of temporal adaptive filters applicable to a current video block of the video that is coded with an adaptive loop filter (ALF); and generating a decoded current video block from the bitstream representation by selectively applying, based on the determining, the set of temporal adaptive filters.

B9. The method of solution B8, wherein, in a case that the set of the temporal adaptive filters is unavailable, then the generating is performed without applying the set of temporal adaptive filters.

B10. The method of solution B8 or B9, wherein, in a case that the set of the temporal adaptive filters is not unavailable, then performing the generating comprises applying the set of temporal adaptive filters.

B11. The method of any of solutions B1 to B10, wherein the one or more sets of temporal adaptive filters are included in an adaptation parameter set (APS), and wherein the indication is an APS index.

B12. The method of any of solutions B1 to B10, further comprising: determining, based on gradient calculations in different directions, a filter index for at least one of the one or more sets of temporal adaptive filters.

B13. The method of any of solutions B1 to B11, further comprising: determining that none of the one or more sets of the temporal adaptive filter is available and that a new ALF coefficient set and a fixed ALF coefficient set are not used in a coding tree block (CTB), a block, a tile group, a tile, a slice or a picture comprising the current video block; and inferring, based on the determining, that adaptive loop filtering is disabled.

B14. The method of any of solutions B1 to B11, wherein the bitstream representation comprises a first indication of a use of a new ALF coefficient set and a second indication of a use of a fixed ALF coefficient set in response to at least one of the one or more sets of the temporal adaptive filter being unavailable, and wherein exactly one of the first indication and the second indication is true in the bitstream representation.

B15. The method of solution B14, wherein the bitstream representation conforms to a format rule associated with an operation of the ALF.

B16. The method of any of solutions B1 to B11, wherein, in response to none of the one or more sets of temporal adaptive filters being available, the bitstream representation comprises an indication that the ALF is enabled and that a new ALF coefficient set and a fixed ALF coefficient set are not used in a coding tree block (CTB), a block, a tile group, a tile, a slice or a picture comprising the current video block.

B17. The method of solution B16, wherein the bitstream representation does not conform to a format rule associated with an operation of the ALF.

B18. The method of any of solutions B1 to B17, wherein the ALF is applied to one or more color components associated with the current video block.

B19. A method for video processing, comprising: determining, for a current video block that is coded with an adaptive loop filter, a number of temporal adaptive loop filtering (ALF) coefficient sets based on available temporal ALF coefficient sets, wherein the available temporal ALF coefficient sets have been encoded or decoded prior to the determining, and wherein the number of ALF coefficient sets is used for a tile group, a tile, a slice, a picture, a coding tree block (CTB), or a video unit comprising the current video block; and performing, based on the number of temporal ALF coefficient sets, a conversion between the current video block and a bitstream representation of the current video block.

B20. The method of solution B19, wherein a maximum number of the number of temporal ALF coefficient sets is set equal to a number of available temporal ALF coefficient sets.

B21. The method of solution B20, wherein the number of the temporal ALF coefficient sets is set equal to a smaller of the number of available temporal ALF coefficient sets and a predefined number N, wherein N is an integer, and wherein N≥0.

B22. The method of solution B21, wherein N=5.

B23. A method of video processing, comprising: processing, as part of a conversion between a current video block of a video and a bitstream representation of the video, one or more new adaptive loop filtering (ALF) coefficient sets, wherein the current video block is coded with an adaptive loop filter; and designating, subsequent to the processing, the one or more new ALF coefficient sets as available ALF coefficient sets.

B24. The method of solution B23, further comprising: encountering an intra random access point (IRAP) access unit, an IRAP picture, an instantaneous decoding refresh (IDR) access unit or an IDR picture; and designating, based on the encountering, the available ALF coefficient sets as unavailable ALF coefficient sets.

B25. The method of solution B23 or B24, wherein at least one of the available ALF coefficient sets is a temporal ALF coefficient set for video blocks subsequent to the current video block.

B26. The method of any of solutions B23 to B25, wherein the available ALF coefficient sets are maintained in an ALF coefficient set list with a maximum size of N, wherein N is an integer.

B27. The method of solution B26, wherein the ALF coefficient set list is maintained in a first in first out (FIFO) order.

B28. The method of any of solutions B1 to B27, wherein one ALF coefficient set list is maintained for each temporal layer associated with the current video block.

B29. The method of any of solutions B1 to B27, wherein one ALF coefficient set list is maintained for K neighboring temporal layers associated with the current video block.

B30. The method of any of solutions B1 to B27, wherein a first ALF coefficient set list is maintained for a current picture comprising the current video block, and wherein a second ALF coefficient set list is maintained for a picture subsequent to the current picture.

B31. The method of solution B30, wherein the picture subsequent to the current picture is predicted based on the current picture, and wherein the first ALF coefficient set list is identical to the second ALF coefficient set list.

B32. The method of solution B30, wherein the current picture is predicted based on the picture subsequent to the current picture and a picture preceding the current picture, and wherein the first ALF coefficient set list is identical to the second ALF coefficient set list.

B33. The method of solution B23, further comprising: encountering an intra random access point (IRAP) access unit, an IRAP picture, an instantaneous decoding refresh (IDR) access unit or an IDR picture; and emptying, subsequent to the encountering, one or more ALF coefficient set lists.

B34. The method of solution B23, wherein different ALF coefficient set lists are maintained for different color components associated with the current video block.

B35. The method of solution B34, wherein the different color components comprise one or more of a luma component, a Cr component, and a Cb component.

B36. The method of solution B23, wherein one ALF coefficient set list is maintained for a plurality of pictures, tile groups, tiles, slices, or coding tree units (CTUs), and wherein an indexing of the one ALF coefficient set list is different for each of the plurality of pictures, tile groups, tiles, slices, or coding tree units (CTUs).

B37. The method of solution B36, wherein the indexing is in an ascending order and based on a first temporal layer index associated with the current video block and a second temporal layer index associated with a current picture, tile group, tile, slice, or coding tree unit (CTU) comprising the current video block.

B38. The method of solution B36, wherein the indexing is in an ascending order and based on a picture order count (POC) associated with the current video block and a second POC associated with a current picture, tile group, tile, slice, or coding tree unit (CTU) comprising the current video block.

B39. The method of solution B36, wherein the indexing comprises the smallest indices assigned to the available ALF coefficient sets.

B40. The method of solution B23, wherein the conversion comprises a clipping operation, and the method further comprising: classifying, for a sample of the current video block, neighboring samples of the sample into a plurality of groups; and using a single set of parameters, signaled in the bitstream representation, for the clipping operation for each of the plurality of groups.

B41. The method of solution B23, wherein the conversion comprises a clipping operation, and wherein a set of parameters for the clipping operation is predefined for the one or more new ALF coefficient sets.

B42. The method of solution B23, wherein the conversion comprises a clipping operation, and wherein a set of parameters for the clipping operation is signaled in the bitstream representation for the one or more new ALF coefficient sets.

B43. A method for video processing, comprising: determining, for a conversion between a current video block of a video and a bitstream representation of the video, that an indication of adaptive loop filtering (ALF) in a header of a video region of the video is equal to an indication of ALF in an adaptive parameter set (APS) network abstraction layer (NAL) unit associated with the bitstream representation; and performing the conversion.

B44. The method of solution B43, wherein the video region is a picture.

B45. The method of solution B43, wherein the video region is a slice.

B46. A method for video processing, comprising: selectively enabling, for a conversion between a current video block of video and a bitstream representation of the video, a non-linear adaptive loop filtering (ALF) operation based on a type of an adaptive loop filter used by a video region of the video; and performing, subsequent to the selectively enabling, the conversion.

B47. The method of solution B46, wherein the video region is a coding tree unit (CTU), and wherein the non-linear ALF operation is disabled upon a determination that the type of the adaptive loop filter comprises a fixed ALF set or a temporal ALF set.

B48. The method of solution B46, wherein the video region is a slice, a tile group, a tile or a coding tree unit (CTU), and wherein the non-linear ALF operation is enabled upon a determination that the type of the adaptive loop filter comprises a fixed ALF set.

B49. The method of solution B46, further comprising: selectively signaling, in the bitstream representation, one or more clipping parameters for the non-linear ALF operation.

B50. The method of solution B49, wherein the one or more clipping parameters are signaled.

B51. The method of solution B49, wherein the one or more clipping parameters are signaled for ALF filter coefficient sets that are signaled in the bitstream representation.

B52. The method of solution B49, wherein the one or more clipping parameters are signaled upon a determination that the type of the adaptive loop filter comprises a fixed ALF set.

B53. The method of any of solutions B19 to B52, wherein the conversion generates the current video block from the bitstream representation.

B54. The method of any of solutions B19 to B52, wherein the conversion generates the bitstream representation from the current video block.

B55. An apparatus in a video system comprising a processor and a non-transitory memory with instructions thereon, wherein the instructions upon execution by the processor, cause the processor to implement the method in any one of solutions B1 to B54.

B56. A computer program product stored on a non-transitory computer readable media, the computer program product including program code for carrying out the method in any one of solutions B1 to B54.

In some embodiments, the following technical solutions can be implemented:

C1. A method for video processing, comprising performing, for a current video block, a filtering process that comprises two or more operations with at least one intermediate result; applying a clipping operation to the at least one intermediate result; and performing, based on the filtering operation, a conversion between the current video block to a bitstream representation of the current video block.

C2. The method of solution C1, further comprising classifying, for a sample of the current video block, neighboring samples of the sample into a plurality of groups, wherein the clipping operation is applied with different parameters to intermediate results in each of the plurality of groups.

C3. The method of solution C2, wherein the at least one intermediate result comprises a weighted average of differences between the current sample and the neighboring samples in each of the plurality of groups.

C4. The method of solution C2, wherein the filtering process uses filter coefficients, and wherein the at least one intermediate result comprises a weighted sum of the filter coefficients and differences between the current sample and the neighboring samples.

C5. The method of solution C1, wherein a plurality of neighboring samples of a sample of the current video block share a filter coefficient, and wherein the clipping operation is applied once to each of the plurality of neighboring samples.

C6. The method of solution C5, wherein a filter shape associated with the filtering operation is in a symmetric mode.

C7. The method of solution C5 or C6, wherein one or more parameters of the clipping operation is signaled in the bitstream representation.

C8. The method of any of solutions C1 to C7, wherein the clipping operation is defined as K(min, max, input), wherein input is an input to the clipping operation, min is a nominal minimum value of an output of the clipping operation, and max is a nominal maximum value of the output of the clipping operation.

C9. The method of solution C8, wherein an actual maximum value of the output of the clipping operation is less than the nominal maximum value, and wherein an actual minimum value of the output of the clipping operation is greater than the nominal minimum value.

C10. The method of solution C8, wherein an actual maximum value of the output of the clipping operation is equal to the nominal maximum value, and wherein an actual minimum value of the output of the clipping operation is greater than the nominal minimum value.

C11. The method of solution C8, wherein an actual maximum value of the output of the clipping operation is less than the nominal maximum value, and wherein an actual minimum value of the output of the clipping operation is equal to the nominal minimum value.

C12. The method of solution C8, wherein an actual maximum value of the output of the clipping operation is equal to the nominal maximum value, and wherein an actual minimum value of the output of the clipping operation is equal to the nominal minimum value.

C13. A method for video processing, comprising performing, based on an unavailability of a temporal adaptive loop filtering coefficient set, a conversion between the current video block and a bitstream representation of the current video block such that the bitstream representation omits an indication of the temporal adaptive loop filtering coefficient set.

C14. The method of solution C13, further comprising determining that new adaptive loop filtering (ALF) coefficients and fixed ALF coefficients are not used in a coding tree block (CTB), a block, a tile group, a tile, a slice or a picture comprising the current video block; and inferring that adaptive loop filtering is disabled.

C15. The method of solution C13, wherein a conformance bitstream comprises an indication of new adaptive loop filtering (ALF) coefficients or an indication of fixed ALF coefficients.

C16. A method for video processing, comprising determining, for a current video block, one or more temporal adaptive loop filtering (ALF) coefficient sets based on available temporal ALF coefficient sets, wherein the available temporal ALF coefficient sets have been encoded or decoded prior to the determining; and performing, based on the one or more temporal ALF coefficient sets, a conversion between the current video block and a bitstream representation of the current video block.

C17. The method of solution C16, wherein a maximum number of the one or more temporal ALF coefficient sets is $ALF_{available}$.

C18. The method of solution C17, wherein a number of the one or more temporal ALF coefficient sets is min(N, $ALF_{available}$), wherein N is an integer, and wherein N≥0.

C19. The method of solution C18, wherein N=5.

C20. A method of video processing, comprising processing, for a current video block, one or more new adaptive loop filtering (ALF) coefficient sets; designating, subsequent to the processing, the one or more new ALF coefficient sets as available ALF coefficient sets; and performing, based on the available ALF coefficient sets, a conversion between the current video block and a bitstream representation of the current video block.

C21. The method of solution C20, further comprising encountering an intra random access point (IRAP) access unit, an IRAP picture, an instantaneous decoding refresh (IDR) access unit or an IDR picture; and designating the available ALF coefficient sets as unavailable ALF coefficient sets.

C22. The method of solution C20 or C21, wherein the available ALF coefficient sets are temporal ALF coefficient sets for video blocks subsequent to the current video block.

C23. The method of any of solutions C20 to C22, wherein the available ALF coefficient sets are maintained in an ALF coefficient set list with a maximum size of N, wherein N is an integer.

C24. The method of solution C23, wherein the ALF coefficient set list is maintained in a first in first out (FIFO) order.

C25. The method of any of solutions C13 to C24, wherein one ALF coefficient set list is maintained for each temporal layer associated with the current video block.

C26. The method of any of solutions C13 to C24, wherein one ALF coefficient set list is maintained for K neighboring temporal layers associated with the current video block.

C27. The method of any of solutions C13 to C24, wherein a first ALF coefficient set list is maintained for a current picture comprising the current video block, and wherein a second ALF coefficient set list is maintained for a picture subsequent to the current picture.

C28. The method of solution C27, wherein the picture subsequent to the current picture is predicted based on the current picture, and wherein the first ALF coefficient set list is identical to the second ALF coefficient set list.

C29. The method of solution C20, further comprising encountering an intra random access point (IRAP) access unit, an IRAP picture, an instantaneous decoding refresh (IDR) access unit or an IDR picture; and emptying, subsequent to the encountering, one or more ALF coefficient set lists.

C30. The method of solution C20, wherein different ALF coefficient set lists are maintained for different color components of the current video block.

C31. An apparatus in a video system comprising a processor and a non-transitory memory with instructions thereon, wherein the instructions upon execution by the processor, cause the processor to implement the method in any one of solutions C1 to C30.

C32. A computer program product stored on a non-transitory computer readable media, the computer program product including program code for carrying out the method in any one of solutions C1 to C30.

Figure 12:
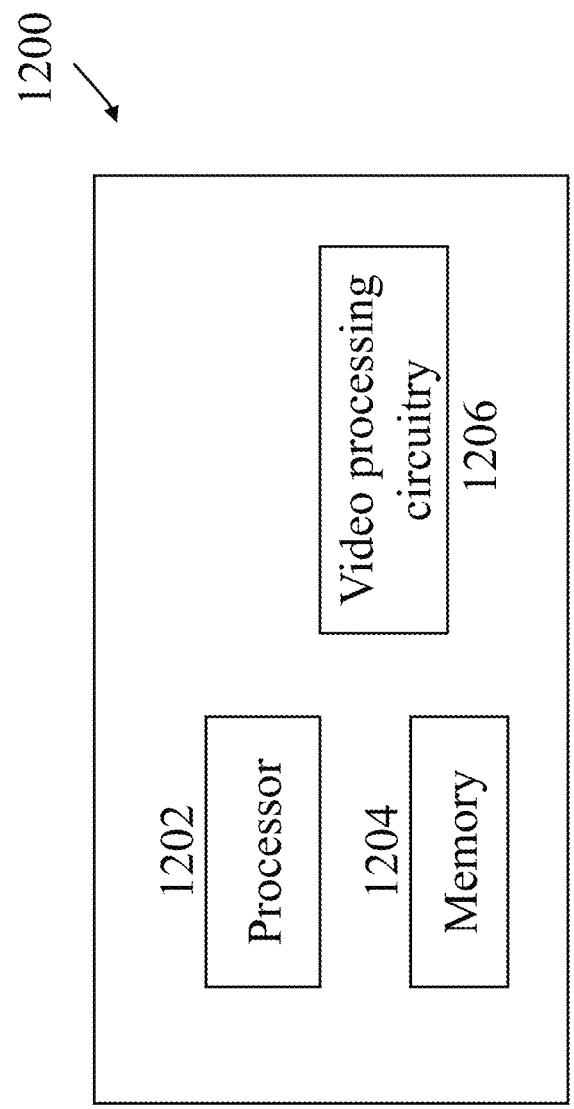
FIG. 12 is a block diagram of an example of a hardware platform for implementing a visual media decoding or a visual media encoding technique described in the present document.

FIG. 12 is a block diagram of a video processing apparatus 1200. The apparatus 1200 may be used to implement one or more of the methods described herein. The apparatus 1200 may be embodied in a smartphone, tablet, computer, Internet of Things (IoT) receiver, and so on. The apparatus 1200 may include one or more processors 1202, one or more memories 1204 and video processing hardware 1206. The processor(s) 1202 may be configured to implement one or more methods (including, but not limited to, methods 1100 and 1150) described in the present document. The memory (memories) 1204 may be used for storing data and code used for implementing the methods and techniques described herein. The video processing hardware 1206 may be used to implement, in hardware circuitry, some techniques described in the present document.

In some embodiments, the video coding methods may be implemented using an apparatus that is implemented on a hardware platform as described with respect to FIG. 12.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 13:
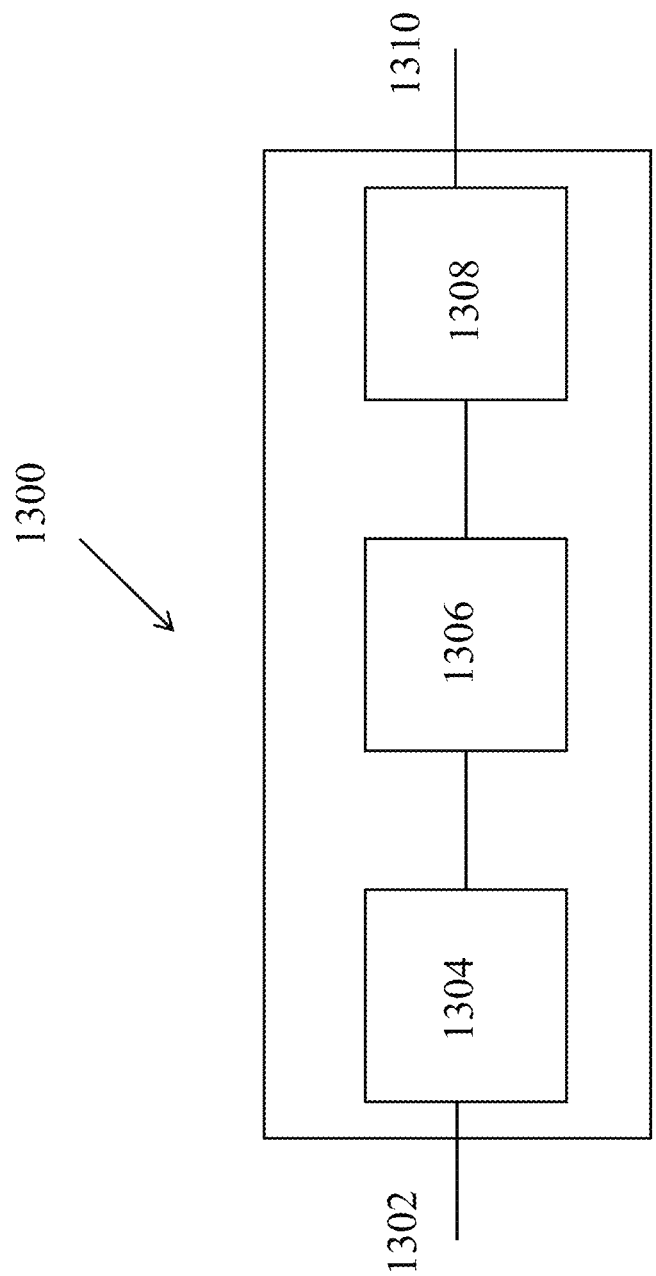
FIG. 13 is a block diagram of an example video processing system in which disclosed techniques may be implemented.

FIG. 13 is a block diagram showing an example video processing system 1300 in which various techniques disclosed herein may be implemented. Various implementations may include some or all of the components of the system 1300. The system 1300 may include input 1302 for receiving video content. The video content may be received in a raw or uncompressed format, e.g., 8 or 10 bit multi-component pixel values, or may be in a compressed or encoded format. The input 1302 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1300 may include a coding component 1304 that may implement the various coding or encoding methods described in the present document. The coding component 1304 may reduce the average bitrate of video from the input 1302 to the output of the coding component 1304 to produce a coded representation of the video. The coding techniques are therefore sometimes called video compression or video transcoding techniques. The output of the coding component 1304 may be either stored, or transmitted via a communication connected, as represented by the component 1306. The stored or communicated bitstream (or coded) representation of the video received at the input 1302 may be used by the component 1308 for generating pixel values or displayable video that is sent to a display interface 1310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a first video region of a video and a bitstream of the video, a first syntax element corresponding to the first video region is present in the bitstream, wherein the first syntax element indicates an index of a first adaptation parameter set that first video region refers to, and wherein the first video region is a video picture or a video slice, when the first video region is the video picture, the first syntax element is present in a picture header syntax element set, and when the first video region is a video slice, the first syntax element is present in a slice header syntax element set; and
   performing the conversion based on the determining;
   wherein, in response to the first syntax element being present in the picture header syntax element set or the slice header syntax element set, a value of a second syntax element included in the first adaptation parameter set is 1, and wherein the second syntax element indicates whether to include a luma filter set in the first adaptation parameter set, and
   wherein, for a sample of the first video region, a filter index is derived based on multiple sample differences in different directions, and a specific luma filter is selected, based on the filter index, from the luma filter set in the first adaption parameter set and other luma filters which are not included in the luma filter set,
   wherein the video region includes multiple video coding tree blocks, and the video coding tree block is split into multiple M*M video block, M is equal to 2 or 4, and wherein same filter index is applied for samples in a same M*M video block;
   wherein the multiple sample differences in different directions are derived for every M*M video region based on 1:2 subsampling rate.

2. The method of claim 1, wherein the first adaptation parameter set includes an adaptive loop filtering adaptation parameter set.

3. The method of claim 1, wherein a maximum value of the filter index is indicated by N, and a number of luma filters in the luma filter set is smaller than or equal to N+1.

4. The method of claim 3, wherein in response to the number of luma filters in the luma filter set is smaller than N+1, at least two luma filter with different filter indices have same filter coefficients.

5. The method of claim 1, wherein the conversion includes encoding the current video block into the bitstream.

6. The method of claim 1, wherein the conversion includes decoding the current video block from the bitstream.

7. An apparatus for processing video data comprising a processor and a non-transitory memory with instructions thereon, wherein the instructions upon execution by the processor, cause the processor to:
   determine, for a conversion between a first video region of a video and a bitstream of the video, a first syntax element corresponding to the first video region is present in the bitstream, wherein the first syntax element indicates an index of a first adaptation parameter set that first video region refers to, and wherein the first video region is a video picture or a video slice, when the first video region is the video picture, the first syntax element is present in a picture header syntax element set, and when the first video region is a video slice, the first syntax element is present in a slice header syntax element set; and perform the conversion based on the determining;

wherein, in response to the first syntax element being present in the picture header syntax element set or the slice header syntax element set, a value of a second syntax element included in the first adaptation parameter set is 1, and wherein the second syntax element indicates whether to include a luma filter set in the first adaptation parameter set, and wherein, for a sample of the first video region, a filter index is derived based on multiple sample differences in different directions, and a specific luma filter is selected, based on the filter index, from the luma filter set in the first adaption parameter set and other luma filters which are not included in the luma filter set;

wherein the video region includes multiple video coding tree blocks, and the video coding tree block is split into multiple M*M video block, M is equal to 2 or 4, and wherein same filter index is applied for samples in a same M*M video block;

wherein the multiple sample differences in different directions are derived for every M*M video region based on 1:2 subsampling rate.

8. The apparatus of claim 7, wherein the first adaptation parameter set includes an adaptive loop filtering adaptation parameter set.

9. The apparatus of claim 7, wherein a maximum value of the filter index is indicated by N, and a number of luma filters in the luma filter set is smaller than or equal to N+1.

10. The apparatus of claim 9, wherein in response to the number of luma filters in the luma filter set is smaller than N+1, at least two luma filter with different filter indices have same filter coefficients.

11. A non-transitory computer-readable storage medium storing instructions that cause a processor to:

determine, for a conversion between a first video region of a video and a bitstream of the video, a first syntax element corresponding to the first video region is present in the bitstream, wherein the first syntax element indicates an index of a first adaptation parameter set that first video region refers to, and wherein the first video region is a video picture or a video slice, when the first video region is the video picture, the first syntax element is present in a picture header syntax element set, and when the first video region is a video slice, the first syntax element is present in a slice header syntax element set; and perform the conversion based on the determining;

wherein, in response to the first syntax element being present in the picture header syntax element set or the slice header syntax element set, a value of a second syntax element included in the first adaptation parameter set is 1, and wherein the second syntax element indicates whether to include a luma filter set in the first adaptation parameter set, and wherein, for a sample of the first video region, a filter index is derived based on multiple sample differences in different directions, and a specific luma filter is selected, based on the filter index, from the luma filter set in the first adaption parameter set and other luma filters which are not included in the luma filter set;

wherein the video region includes multiple video coding tree blocks, and the video coding tree block is split into multiple M*M video block, M is equal to 2 or 4, and wherein same filter index is applied for samples in a same M*M video block;

wherein the multiple sample differences in different directions are derived for every M*M video region based on 1:2 subsampling rate.

12. A non-transitory computer-readable recording medium storing a bitstream of a video which is generated by a method performed by a video processing apparatus, wherein the method comprises:

determining, for a first video region of the video, a first syntax element corresponding to the first video region is present in the bitstream, wherein the first syntax element indicates an index of a first adaptation parameter set that first video region refers to, and wherein the first video region is a video picture or a video slice, when the first video region is the video picture, the first syntax element is present in a picture header syntax element set, and when the first video region is a video slice, the first syntax element is present in a slice header syntax element set; and generating the bitstream based on the determining;

wherein, in response to the first syntax element being present in the picture header syntax element set or the slice header syntax element set, a value of a second syntax element included in the first adaptation parameter set is 1, and wherein the second syntax element indicates whether to include a luma filter set in the first adaptation parameter set, and wherein, for a sample of the first video region, a filter index is derived based on multiple sample differences in different directions, and a specific luma filter is selected, based on the filter index, from the luma filter set in the first adaption parameter set and other luma filters which are not included in the luma filter set;

wherein the video region includes multiple video coding tree blocks, and the video coding tree block is split into multiple M*M video block, M is equal to 2 or 4, and wherein same filter index is applied for samples in a same M*M video block;

wherein the multiple sample differences in different directions are derived for every M*M video region based on 1:2 subsampling rate.

13. The non-transitory computer-readable storage medium of claim 11, wherein the first adaptation parameter set includes an adaptive loop filtering adaptation parameter set.

14. The non-transitory computer-readable storage medium of claim 11, wherein the first adaptation parameter set includes an adaptive loop filtering adaptation parameter set.

15. The non-transitory computer-readable storage medium of claim 11, wherein a maximum value of the filter index is indicated by N, and a number of luma filters in the luma filter set is smaller than or equal to N+1.

16. The non-transitory computer-readable storage medium of claim 15, wherein in response to the number of luma filters in the luma filter set is smaller than N+1, at least two luma filter with different filter indices have same filter coefficients.

17. The non-transitory computer-readable storage medium of claim 12, wherein the first adaptation parameter set includes an adaptive loop filtering adaptation parameter set.

* * * * *